(12) United States Patent
Boschker et al.

(10) Patent No.: US 9,710,962 B2
(45) Date of Patent: Jul. 18, 2017

(54) METHODS OF AND APPARATUS FOR DISPLAYING MAP INFORMATION

(75) Inventors: Breght Roderick Boschker, Hilversum (NL); Kornelis Meinds, Waalre (NL)

(73) Assignee: TomTom Navigation B.V., Amsterdam (NL)

( * ) Notice: Subject to any disclaimer, the term of this patent is extended or adjusted under 35 U.S.C. 154(b) by 106 days.

(21) Appl. No.: 14/240,486

(22) PCT Filed: Aug. 23, 2012

(86) PCT No.: PCT/EP2012/066450
§ 371 (c)(1),
(2), (4) Date: Feb. 24, 2014

(87) PCT Pub. No.: WO2013/026909
PCT Pub. Date: Feb. 28, 2013

(65) Prior Publication Data
US 2014/0184591 A1  Jul. 3, 2014

(30) Foreign Application Priority Data
Aug. 23, 2011 (GB) .................................. 1114591.9

(51) Int. Cl.
*G06T 17/05* (2011.01)
*G06T 15/50* (2011.01)
*G06T 15/04* (2011.01)

(52) U.S. Cl.
CPC ............ *G06T 17/05* (2013.01); *G06T 15/04* (2013.01); *G06T 15/50* (2013.01)

(58) Field of Classification Search
CPC ......... G06T 17/05; G06T 15/04; G06T 15/50; G06T 19/00; G06T 17/20; G06T 17/00; G06T 15/10; G06T 15/00
(Continued)

(56) References Cited

U.S. PATENT DOCUMENTS

| | | | | |
|---|---|---|---|---|
| 5,179,642 A | * | 1/1993 | Komatsu | .................. G06T 15/40 345/634 |
| 6,016,150 A | * | 1/2000 | Lengyel et al. | .............. 345/426 |

(Continued)

FOREIGN PATENT DOCUMENTS

| | | |
|---|---|---|
| CN | 101107631 A | 1/2008 |
| CN | 102016505 A | 4/2011 |

(Continued)

OTHER PUBLICATIONS

XP002524044, Anonymous: "Become a layer-blending expert", Internet Citation, Dec. 31, 2003 (Dec. 31, 2003), pp. 1-3, Retrieved from the Internet: URL:http://www.adobe.com/designcenter/photoshop/articles/phs8advblend/phs8advblend.pdf [retrieved on Apr. 8, 2009].

(Continued)

*Primary Examiner* — Sultana M Zalalee

(57) ABSTRACT

In a system that uses tile-based road network rendering for displaying map information to a user, a tile is rendered for display by rendering a tile 10 by using a first texture comprising one or more map features to be displayed for the tile of the map in combination with a second texture to apply a texture to a graphics primitive or primitives representing the tile such that at least one map feature 11, such as a water feature, being displayed on the tile 10 is bordered by a border region 24 that represents a border to that map feature. In this way, a more visually appealing depiction of the map feature 11 can be achieved.

13 Claims, 10 Drawing Sheets

(58) Field of Classification Search
USPC .......................................................... 345/419
See application file for complete search history.

(56) References Cited

U.S. PATENT DOCUMENTS

| | | | |
|---|---|---|---|
| 6,956,576 B1* | 10/2005 | Deering | G06T 15/00 345/475 |
| 7,551,182 B2 | 6/2009 | Bethune et al. | |
| 8,620,106 B2 | 12/2013 | Pryszo | |
| 8,665,263 B2 | 3/2014 | Yoshida et al. | |
| 8,756,000 B2 | 6/2014 | Tertoolen | |
| 2006/0028489 A1* | 2/2006 | Uyttendaele | G09G 5/00 345/646 |
| 2006/0170693 A1* | 8/2006 | Bethune et al. | 345/568 |
| 2008/0192053 A1 | 8/2008 | Howell et al. | |
| 2008/0226179 A1* | 9/2008 | Dohta | A63F 13/00 382/232 |
| 2009/0015588 A1 | 1/2009 | Nagayama et al. | |
| 2009/0067750 A1 | 3/2009 | Pryszo et al. | |
| 2009/0213111 A1 | 8/2009 | Jung | |
| 2010/0074523 A1* | 3/2010 | Ishiga | G06K 9/00684 382/170 |
| 2011/0050685 A1* | 3/2011 | Yamada | G06T 15/10 345/419 |
| 2011/0090311 A1* | 4/2011 | Fang | H04N 7/15 348/43 |
| 2011/0181588 A1* | 7/2011 | Barenbrug | G06T 15/205 345/419 |
| 2012/0002899 A1* | 1/2012 | Orr, IV | G06T 5/50 382/282 |
| 2012/0306904 A1* | 12/2012 | Francois | G06T 7/194 345/589 |

FOREIGN PATENT DOCUMENTS

| | | |
|---|---|---|
| CN | 102105907 A | 6/2011 |
| CN | 102138163 A | 7/2011 |
| EP | 2133842 A1 | 12/2009 |
| EP | 2138926 A1 | 12/2009 |
| JP | 2002056404 A | 2/2002 |
| JP | 2007170834 A | 7/2007 |
| JP | 2007199331 A | 8/2007 |
| JP | 2008128928 A | 6/2008 |
| WO | 9848381 A1 | 10/1998 |
| WO | 2007034822 A1 | 3/2007 |
| WO | 2009027788 A2 | 3/2009 |
| WO | 2011124276 A1 | 10/2011 |

OTHER PUBLICATIONS

Bump-Mapping, Multi-Texturing & Extensions, Lesson 22 of the series of OpenGL tutorials by NeHe-Production: http://nehe.gamedev.net/tutorial/bumpmapping_multitexturing_extensions/16009/ Retrieved from the Internet Aug. 23, 2011.
Emboss Bump Mapping by Michael I. Gold, NVIDIA Corporation.
Search Report issued Dec. 16, 2011 for GB Patent Application No. GB1114591.9.
International Search Report issued Feb. 15, 2013 for International Application No. PCT/EP2012/066450.

* cited by examiner

METHODS OF AND APPARATUS FOR DISPLAYING MAP INFORMATION

CROSS-REFERENCES TO RELATED APPLICATIONS

This application is the National Stage of International Application No. PCT/EP2012/066450, filed on Aug. 23, 2012, and designating the United States. The application claims the benefit of United Kingdom Patent Application No. 1114591.9 filed Aug. 23, 2011. The entire content of these applications is incorporated herein by reference.

FIELD OF THE INVENTION

This invention relates to navigation devices and to methods and apparatus for displaying map information, such as navigation maps. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to display map information and/or to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, routes.tomtom.com provides an on-line route planning and navigation facility, which allows a user to enter a start point and a destination whereupon the server to which the user's PC is connected calculates a route (aspects of which may be user specified), generates a map, and generates a set of exhaustive navigation instructions for guiding the user from the selected start point to the selected destination.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO LIVE 1005 model manufactured and supplied by TomTom International B.V., provide a reliable means for enabling users to navigate from one position to another.

As will be appreciated from the above, an important aspect of the operation of such navigation devices is the display of map information to the user by the device. This may be done, for example, by rendering the whole scene based on the vector data for each frame.

Another known technique is to represent the map information (in the 3D world) on a tile-by-tile basis, i.e. to represent the 3D "world" view of the map (which will then be transformed to 2D screen space for display, as is known in the art) as one or more tiles, each representing some or all of the map in the 3D world view of the map to be displayed.

In such arrangements, the tiles may, as is known in the art, be stored and displayed at varying resolutions (mipmaps). The different resolution tiles may also be overlaid and filtered to provide a more seamless transition between mipmaps.

Such tile-based map and road network rendering is an efficient and powerful way for displaying road network and geographic data in both two and three dimensions. Tile-based rendering is especially efficient given that most mobile graphics rendering subsystems (which is typically what will be used in a PND (and may be implemented in hardware or software or both, as is known in the art)) are limited in the amount of geometry they can process in order to get an acceptable frame rate and that a lot of the more powerful features found in desktop graphics accelerators have not made it to the mobile space yet.

However, the Applicants have recognised that tile-based methods in their current form are not so well suited for displaying features that are below (or above) the ground level such as water features (canals, rivers etc.) and/or lowered road segments or indeed any 'open air' feature that could be represented at lower or higher than ground level.

Such features can be obtained by modifying the tile geometry, for example by sub-dividing the tiles into smaller tiles and/or triangles and lowering or raising these, or by using e.g. a mesh of triangles where the vertices of the triangles are placed at the correct height or depth. However, this greatly increases the amount of geometry needing to be stored and processed, which generally leads to decreased performance and higher storage cost.

On new hardware, features of graphics accelerators such as vertex or geometry shaders may be used to modify the geometry fed to the graphics accelerators.

However, particularly on mobile devices, such techniques can be inefficient due to the amount of geometry required, or not possible if the necessary hardware features are missing in the graphics rendering sub-system that is used in the device.

The Applicants believe therefore that there remains scope for improvements to the display of map information on navigation devices.

SUMMARY OF THE INVENTION

According to a first aspect of the present invention, there is provided a method of displaying map information, the method comprising:

using a first graphics texture comprising one or more map features to be displayed for the map in combination with a second graphics texture to apply a texture to a graphics primitive or primitives in order to display the map information; and displaying the graphics primitive or primitives having the applied texture to display the map information; wherein:

the second texture and the combining operation are configured such that using the first texture in combination with the second texture causes at least one map feature being displayed to be bordered by a border region that represents a border to that map feature.

According to a second aspect of the present invention, there is provided a navigation or mapping apparatus, comprising:

a display for displaying a digital map to a user; and a processor configured to access digital map data and render a digital map to be displayed on the display; and characterised by the processor further comprising:

means for rendering digital map data for display by:

using a first graphics texture comprising one or more map features to be displayed in combination with a second graphics texture to apply a texture to a graphics primitive or primitives in order to display the map; and displaying the graphics primitive or primitives having the applied texture to display the map; wherein:

the second texture and the combining operation are configured such that using the first texture in combination with the second texture causes at least one map feature being displayed to be bordered by a border region that represents a border to that map feature.

In the present invention, map information to be displayed is rendered for display by using two textures in combination so as to cause at least one of the map features being displayed to be bordered by a border region that represents a border to that map feature.

As will be discussed further below, the Applicants have recognised that this can provide a technique for more realistically rendering, for example, features that lie above or below a given plane, such as water features, buildings, windows of buildings, etc., but in a more efficient manner that is suitable for use, e.g., on more limited (e.g. graphics geometry limited) devices, such as mobile devices.

In particular, the Applicants have found that such border effects can increase the visual quality of the display considerably. In particular, the Applicants have recognised that by providing an, e.g., contrasting border to a feature that will be seen on a displayed map, the human viewer will tend to perceive that border region as a surface or edge extending into (or out of) the plane in the displayed image, thereby giving an enhanced impression of depth (height differences) in the displayed image.

Furthermore, although the visual quality of the present technique may not be able to fully compete with more complex methods used in e.g. gaming (e.g. increasing vertex count, bump mapping etc.), it can provide a relatively fast and efficient way to improve the visual quality of e.g. tile-based map display.

Thus the present invention is well suited to embedded graphics hardware since it can create the desired effects with no increase in geometry, or no increase in geometry (e.g. by reusing existing vertex buffer objects). It therefore lends itself well for use on current and (near) future system-on-chip arrangements for PNDs, since the types of graphics rendering sub-systems contained therein are typically quite restricted in the amount of geometry they can efficiently process.

This said, as will be discussed further below, the present invention is not exclusively applicable to portable and more limited devices, but can also advantageously be used for more powerful graphics rendering sub-systems if desired.

The present invention is particularly, although not exclusively, suited to tile-based map information rendering. In this case the primitive(s) being rendered will represent a respective tile of the map to be displayed.

Thus according to a third aspect of the present invention, there is provided a method of displaying map information using tile-based map information rendering, the method comprising:

for a tile to be displayed to display the map information, rendering the tile for display by:

using a first graphics texture comprising one or more map features to be displayed for the tile of the map in combination with a second graphics texture to apply a texture to a graphics primitive or primitives representing the tile to be displayed in order to display the map information; and displaying the graphics primitive or primitives representing the tile having the applied texture to display the tile to display the map information; wherein:

the second texture and the combining operation are configured such that using the first texture in combination with the second texture causes at least one map feature being displayed on the tile to be bordered by a border region that represents a border to that map feature.

According to a fourth aspect of the present invention, there is provided a navigation or mapping apparatus, comprising:

a display for displaying a digital map to a user; and a processor configured to access digital map data and cause a digital map to be displayed on the display using tile-based map information rendering; and characterised by the processor further comprising:

means for rendering a tile to be displayed to display the map information by:

using a first graphics texture comprising one or more map features to be displayed for the tile of the map in combination with a second graphics texture to apply a texture to a graphics primitive or primitives representing the tile to be displayed in order to display the map information; and displaying the graphics primitive or primitives representing the tile having the applied texture to display the tile to display the map information; wherein:

the second texture and the combining operation are configured such that using the first texture in combination with the second texture causes at least one map feature being displayed on the tile to be bordered by a border region that represents a border to that map feature.

As will be appreciated, the tiles that are rendered and that are being referred to in these aspects and embodiments of the present invention are tiles representing the map information in the 3D space, and thus are not "tiles" that are used when rendering the 2D scene in screen space for display, but rather tiles in the 3D world which will then be projected to the 2D screen space when they are actually displayed. Thus references herein to tile-based rendering, unless the context clearly requires otherwise, are intended to refer to arrangements in which the image to be displayed (e.g. the map information) is represented as a tile or tiles in 3D "world" space, which tiles are then projected into 2D "screen" space for display.

The technique of the present invention may be used for as many tiles (tile positions) of the displayed map information (the image being displayed) as desired, e.g., depending on the nature of the image being displayed. Thus there may, for example, be only a single tile position of the image that is rendered using the technique of the present invention, or there may be, and indeed, may more typically be, plural tiles (tile positions) that are so rendered (this would be the case where, e.g., there is a feature, such as a water feature, that passes through plural tiles of the image (map) being displayed). Any tiles that are not rendered using the technique of the present invention may be rendered in the normal manner.

The primitive or primitives to which the texture(s) are applied can be any suitable and desired graphics primitives (i.e. primitives that are used for graphics rendering operations). As is known in the art, the graphics primitives typically will be, and preferably are, simple polygons, such as triangles or rectangles. A given map tile may be represented using a single primitive, or plural primitives, as desired.

The map feature(s) that are provided with border regions in the present invention preferably represent features that lie above or below the plane of the displayed map (as the effect of the present invention is to enhance the perception of depth and height differences in the displayed image).

In a preferred embodiment, the plane of the map represents the "ground", in which case the "bordered" map features preferably represent below ground level features, such as water features, tunnels, cuttings, etc., and/or above "ground" level features, such as the roofs of buildings.

It would also be possible for the plane of the map to represent not the ground, but some other plane, such as the side of a building or other object (e.g. a vertical, rather than a horizontal, plane). In this case the plane of the map could represent e.g., the face of a building, with the bordered features then, e.g., being the positions of windows and/or doors of the building.

As discussed above, the arrangement of the present invention is such that one or more map features, such as rivers, are displayed with a border. The arrangement is preferably such that the map feature(s) that are intended to be "bordered" are bordered, at least in part, by map (image) regions having a different appearance. This can then relatively straightforwardly give a border effect to the map feature(s).

The border (border region) is accordingly preferably rendered to be a different colour or shade to the map feature being "bordered". It is preferably rendered to be a contrasting colour or shade to the map feature. The border may be a different, e.g. darker shade, of the colour of the map feature itself, or it may be a different colour to the colour of the map feature itself. It is preferably darker than the map feature, for example black or dark blue or dark gray. The border most preferably appears as a dark edge to the map feature in question.

The arrangement should be such that the border and map feature are displayed appropriately. Thus, the border should appear at the edge of the map feature when the image is displayed.

The border could surround the map feature. However, the Applicants have appreciated that the border need not be seen (and, indeed, is preferably not seen) all the way around the map feature when the image is displayed. Rather, the border preferably is seen as would be appropriate for the viewing direction in question, for example, and preferably, at the far (or near) side of the map feature as seen by the viewer, but not at the near (or far, respectively) side of the map feature as seen by the viewer. This enhances the visual effect of the border region in the map making it look as though the map feature is at a different level to other features in the map when displayed.

The first and second textures may in general be configured in any suitable and desired manner to achieve the desired display. Equally, they may be applied to the primitive(s) and used in combination using any suitable and desired texturing (e.g. texture mapping) technique, for example by using texture mapping processes and systems of existing graphics processing systems.

(This said, the Applicants have developed certain preferred techniques for configuring and using textures to achieve the effects of the present invention. These techniques will be described below.)

The first texture should comprise (i.e. show when applied to a primitive) one or more map features to be displayed. These features could comprise any suitable map features, such as roads, buildings, fields, etc. The first texture could include the features that are to be displayed with borders (and in some preferred embodiments, this is the case).

The first texture may e.g., be a predefined texture that is, e.g., stored as part of the map information that defines the map in question, or it may be a texture that is generated from stored map geometry in use, etc.

The second texture may also be, and in one preferred embodiment is, a texture that comprises map features to be displayed. However, it need not be, and may, for example, instead be (and in another preferred embodiment is), a texture that is to be used to modulate or modify the features of the first texture when they are displayed. In this latter case, the second texture map could, e.g., be, and in a preferred embodiment is, in the form of a "dark map" that selectively darkens (or lightens) regions of the first texture when combined with (applied to) the first texture.

The second texture could also be a predefined and stored texture (and in one preferred embodiment this is the case). However, in other preferred embodiments it is a texture that is generated in use. Where the second texture is generated in use, then in a preferred embodiment, it is generated from another texture. That other texture may itself be predefined (and stored), or generated.

In one preferred such embodiment, the second texture is generated from the first texture. In one preferred embodiment, as will be discussed further below, the second texture is generated from a height map that represents the height of map features for the tile (which height map may be predefined, or itself generated in use, e.g., and preferably, from the first texture).

It should be noted here that references herein to first and second textures are intended to refer to the fact that when rendering the map for display, two textures are, in effect, being used. However, the first and second textures do not need to be predefined, and one or both of them can, in effect, be generated in use, at the time the map is being rendered for display (and, indeed, in a preferred embodiment, this is what is done). The second texture may be a version of or derived from the first texture.

Also, the first and second texture need not be stored separately, but could, e.g., be stored as a single texture map, with one texture stored using, e.g., the RGB channels of the texture map and the other texture the alpha channel of the texture map. Also, the second texture need not actually be applied in itself to the primitive, but may, e.g., instead be a texture that is used to modify the application of the first texture to the primitive.

The first and second textures can be used in combination when displaying the map in any suitable and desired manner. For example, any suitable graphics blending technique, such as alpha-blending could be used (and in one preferred embodiment, this is what is done). Alternatively, the textures could be combined in some other way, e.g., by multiplying them together, or by using the second texture to trigger selective modification of the first texture map (e.g., and preferably based on a comparison of the first texture map and second texture map values for a given pixel or by using the second texture map value as an input to a function that selectively modifies the application of the first texture to the primitive(s)).

In some particularly preferred embodiments of the present invention, the first and second textures are used in combination by combining the first texture with a second texture to be applied to the graphics primitive or primitives representing the map, and applying the combined first and second textures to the graphics primitive or primitives representing the map to display the map information.

Thus, according to a fifth aspect of the present invention, there is provided a method of displaying map information, preferably using tile-based map information rendering, the method comprising:

applying a first texture to a graphics primitive or primitives representing the map to be displayed, the first texture comprising one or more map features to be displayed for the map;

combining the first texture applied to the graphics primitive or primitives representing the map with a second texture to be applied to the graphics primitive or primitives representing the map; and displaying the graphics primitive or primitives representing the map having the applied combined first and second textures to display the map information; wherein:

the second texture and the combining operation are configured such that the combined textures cause at least one map feature being displayed to be bordered by a border region that represents a border to that map feature.

According to a sixth aspect of the present invention, there is provided a navigation or mapping apparatus, comprising:

a display for displaying a digital map to a user; and a processor configured to access digital map data and render a digital map to be displayed on the display, preferably using tile-based map information rendering; and characterised by the processor further comprising:

means for rendering digital map data for display by:

applying a first texture to a graphics primitive or primitives representing the map to be displayed, the first texture comprising one or more map features to be displayed for the map;

combining the first texture applied to the graphics primitive or primitives representing the map with a second texture to be applied to the graphics primitive or primitives representing the map; and displaying the graphics primitive or primitives representing the map having the applied combined first and second textures to display the map; wherein:

the second texture and the combining operation are configured such that the combined textures cause at least one map feature being displayed to be bordered by a border region that represents a border to that map feature.

In a first particularly preferred embodiment of the present invention, the first texture is configured to display on the map one or more map features, together with one or more see-through shapes (transparent regions), and the second texture is configured to display map features and borders for those map features to be "seen through" (i.e. to appear in place of) the see-through shapes (the transparent regions) in the first texture when the textures are appropriately mapped to the primitive(s) for the map and combined.

In this embodiment of the present invention, the map information to be displayed will accordingly be rendered for display by applying a first texture to the primitive(s) in which one or more see-through shapes have been provided, and applying a second texture to the primitive(s) to, in effect, "fill in" (with additional visual information) the see-through shapes (parts) in the first texture.

In these arrangements, the first texture may, for example, represent the "ground", in which case it should be, e.g., configured appropriately, and the see-through shapes will then represent the positions of below ground level features, such as water features, tunnels, cuttings, etc. It would also be possible for the first texture to represent above "ground" level features, such as the roofs of buildings. In this case the see-through shapes could, e.g., represent the positions of ground level features, such as roads, fields, etc.

It would also be possible for the first texture to represent not the ground, but some other plane, such as the side of a building or other object (e.g. a vertical, rather than a horizontal, plane). In this case the first texture could be used to render, e.g., the face of a building, with the see-through shapes then, e.g., being the positions of windows and/or doors of the building.

The see-through shapes (transparent regions) in the first texture can be provided in any suitable and desired manner. In a preferred embodiment, the see-through shapes are provided by using alpha textures (transparency). Thus, a transparency factor is applied to the area(s) (region(s)) of the first texture where a see-through shape is to appear.

The see-through shapes may be completely transparent, or they may be rendered to be only partially transparent, or a combination of the two. For example, the see-through shapes for rendering a tunnel may be rendered to be fully transparent at the entrance to the tunnel, but only semi-transparent where the tunnel is actually underground. Thus, in a particularly preferred embodiment, the see-through shapes (transparent regions) in the first texture can use varying and/or different transparency levels.

In a particularly preferred embodiment, the edges of the see-through shapes (transparent regions) in the first texture are rendered with a different transparency to, and preferably to be less transparent than, the body of the see-through shape. By applying, e.g., semi-transparency, to the edges of the see-through shapes in the first texture, hard lines in the displayed image can be avoided.

The second texture in this first particularly preferred embodiment of the present invention should accordingly represent the appropriate map feature(s) that is or are to be seen through the "gaps" formed by the see-through shapes in the first texture, such as below ground level features, such as tunnels, water features, etc., ground level features, or features in a vertical plane, as appropriate.

Preferably the second texture accordingly contains image regions that represent or show the relevant map features that are to be seen "through" the see-through shapes in the first texture. These image regions thus preferably represent one or more of: water features, tunnels, cuttings, windows of buildings, roads, fields, gardens, etc. The image regions in the second texture should be configured to generally overlap (be coincident) with the see-through regions in the first texture when the image is rendered. Thus, in a preferred embodiment, the image region(s) in the second texture are generally similar in size to (match) the corresponding see-through shape(s) in the first texture. Most preferably an image region representing a given map feature in the second texture has the same size, shape and position in the second texture as a corresponding see-through shape in the first texture.

In this preferred embodiment, the second texture is preferably also configured such that the image regions that are intended to be seen through the see-through shapes in the first texture are bordered and/or surrounded by other regions having a different appearance that will represent and form the border to the map features depicted by the image regions when the image is displayed. As will be discussed further below, if the two textures are then combined such that the border regions will also be seen, at least in part, through the see-through shape(s) in the first texture, that can then relatively straightforwardly give the desired border effect to the desired map features in the displayed tile. As discussed above, the border region in the second texture is preferably a contrasting colour or shade to the image region on the second texture. It is preferably darker than the image region, for example black or dark blue or dark gray.

Thus, in a particularly preferred embodiment of these arrangements of the invention, the second texture includes an image region corresponding to an intended map feature that is to be seen through the see-through shape in the corresponding first texture, bordered by a colour that represents a, preferably contrasting, border to that image region.

In this embodiment of the present invention, the first and second textures are preferably combined using a graphics alpha blending operation. This will straightforwardly cause the image and border regions in the second texture representing the map features to be visible in the see-through (transparent) shapes (regions) in the first texture, but not elsewhere.

As discussed above, the configuration and combining of the first and second textures should be such that the region in the second texture that is to form the border appears between the image region in the second texture and the (non-transparent) image in the first texture, when the image is displayed. The border should therefore appear between the edge of the see-through shape in the first texture, and the image region in the second texture.

Furthermore, as discussed above, the border preferably is seen as would be appropriate for the viewing direction in question, for example, and preferably, at the far side of the image region in the second texture as seen by the viewer, but not at the near side of the image region as seen by the viewer (or vice-versa).

This configuration of the image regions, border region and see-through shapes in the first and second textures when the image is displayed can be achieved in any suitable and desired manner.

However, in a particularly preferred embodiment, a displaced version of the second texture is applied to the primitive or primitives and combined with the first texture. The displaced version of the second texture is a version of the second texture that has been perspectively correctly displaced depending on the view direction, i.e. a version of the second texture that has been subjected to a perspective correct displacement dependent on the camera position.

In a particularly preferred embodiment, the displacement of the second texture when it is applied to the primitive or primitives is such that (so as to have the effect that) the second texture is displayed as it were in fact being applied to a plane that lies behind (below) the plane of the first texture (of the primitives to which the textures are being applied).

This is preferably achieved by projecting, according to the camera view (and perspectively correctly), the coordinates of the primitive the second texture is to be applied to (i.e. of the primitive being displayed) from the plane of the primitive to a plane that is below (behind) the plane of the primitive, and then projecting the projected primitive coordinates from the plane that is below (behind) the plane of the primitive orthogonally (perpendicularly) back to the plane of the primitive. The so-projected primitive coordinates then give the positions in the second texture to be applied to (mapped to) the original primitive coordinates (i.e. the unprojected primitive coordinates) when the second texture is to be applied to the primitive.

In other words, to obtain a view-dependent perspective correct displacement of the second texture, the position in the displaced second texture that corresponds to a respective position in the primitive being displayed is preferably determined by projecting the position in the primitive according to the camera view (and perspectively correctly) to a plane that is below (behind) the plane of the primitive that is being displayed, and then projecting the projected primitive position in the plane that is below (behind) the plane of the primitive orthogonally (perpendicularly) back to the plane of the primitive that is being displayed. The position in the original plane of the primitive that is being displayed that the projected position is orthogonally projected back to is then the displaced position in the second texture that should be used for (applied to) the respective position in the primitive being displayed.

Looked at another way, the effect of this is to, in effect, project the position in the primitive in a perspective correct manner according to the camera position (viewpoint) to a displaced "virtual" plane behind the plane of the map on which "virtual" plane the second texture can be considered to be being displayed, and then taking the intersection point of the projected primitive position on the displaced virtual plane as the texture coordinate in the second texture to use for that primitive position when applying the second texture to the primitive.

Thus, in a preferred embodiment the coordinates in the texture space (s, t) of the second texture to use for a respective position in the primitive being displayed are determined by perspectively correctly projecting the world space (x, y, z) position in the primitive onto a displaced "virtual" plane that the second texture is notionally being applied to. (This projection should be along the line through the position in the primitive and the centre of projection (camera position/viewpoint.) The position where the projected primitive position intersects the texture space (s, t) of the second texture in the displaced, "virtual" plane is then the set of texture (s, t) coordinates for the second texture to be associated with the and used for the primitive position in question.

Other arrangements to obtain the perspective-correct displacement could also be used. For example, the displaced second texture, texture coordinates to use for the vertices of the primitive (or primitives) to be displayed could be derived using normal vectors for the vertices of the primitive (or primitives) to be displayed (and in another preferred embodiment this is done).

In a preferred implementation of this arrangement, the normal vectors for the vertices of the primitive (or primitives) to be displayed are determined, normalized to a unit length and then scaled by multiplying them with a selected scalar value to a desired length (which desired length can be thought of as corresponding to (should be set to) the offset between the plane of the primitive (or primitives) to be displayed and the plane that the second texture is effectively being displayed on). The scaled normal vectors are then projected onto the plane of the primitive (or primitives) to be displayed (i.e. projected onto the texture space of the second texture coinciding with the plane of the primitive (or primitives) to be displayed). The two delta components s and t of the respective scaled normal projections should then be used as the displacement of the respective (s, t) texture space coordinates to be used to derive the respective texture space coordinates for the second texture to be associated with (and used for) the vertices of the primitive (or primitives) to be displayed when applying the second texture to those primitives.

Once the coordinates (position) in the second texture to use for a given primitive position have been determined, e.g. in one of the above manners, the second texture can then be applied to the primitive using the so-derived (s, t)-texture space coordinates.

Preferably the displaced positions (the texture coordinates) in the second texture to be used are determined for the vertices of the primitive, with other primitive position values then being determined by perspective correct interpolation from the vertex values. (Perspective correct interpolation along surface attributes (including texture coordinates) of a primitive is a commonly available feature in 3D graphics rendering pipelines, such as OpenGL.) Using so-derived second texture positions for the vertices of the primitive, together with perspective correct interpolation, when applying the second texture to the primitive ensures that a perspective correct displacement, including minification (scaling, making smaller) of the second texture can be obtained, not only on the primitive vertices, but also along the interior surfaces.

The effect of this perspective correct displacement of the second texture before it is applied to the primitives and combined with the first texture is that the image and border regions in the second texture will then be positioned relative to the see-through (transparent) shapes in the first texture as if they lay in a plane that is behind the plane of the first texture and were being seen through the see-through shapes in the first texture. Accordingly, the border and image regions in the second texture will be positioned in the displayed image relative to the image regions of the first texture in the appropriate manner to achieve the desired border effects of the present invention. (For example, if the image region on the second texture has the same size, shape and position in the second texture as a corresponding see-through shape in the first texture, then by effectively applying the second texture as if it were being applied behind the actual map in the 3D world space, the border surrounding the image region should be seen appropriately when the image is projected to 2D screen space for display.)

The "virtual" plane that the second texture is notionally displayed on in these arrangements should be behind the plane of the primitive. In a preferred embodiment, for example in the case of map information display, a vertical offset between the planes (in 3D space) is used, as that then allows the depth effect provided by the present invention to work from all viewing directions. In other arrangements, for example when displaying vertical surfaces, such as faces of buildings, a horizontal offset between (in 3D space) may be, and preferably is, used.

In one preferred embodiment, there is a single second texture "layer" (i.e. virtual displaced plane to which the second texture is, in effect, being "applied"). However, it would also be possible to have more than two "second" "layers", i.e. such that there will be multiple "second" textures at differing "virtual" depths behind the plane of the map to be displayed. In this case an intermediate second texture (i.e. that is not the final "back" second texture) may have both image regions that are to be seen through see-through shapes in the first texture, and see-through shapes itself to allow image regions in a further "second" texture that is below the intermediate second texture to be seen through the intermediate second texture (and the first texture) when the image is appropriately displayed.

By stacking textures at different relative "virtual" depths, features and borders at different (and at multiple) levels can be obtained.

Thus, in a preferred embodiment, a first texture having one or more see-through shapes, one or more layers of intermediate textures having both image regions to be seen through see-through regions in higher layer textures (such as the first texture) and see-through regions to allow lower layer textures to be seen, and a back texture having image regions to be seen through the see-through regions in the front and intermediate textures (texture layers), are rendered.

Once the appropriate displacement (mapping) of the second texture has been performed, the so-mapped second texture can then be applied to the primitive (or primitives) to be displayed along with the first texture and the textures appropriately merged (combined). As discussed above, in these embodiments of the present invention, the textures are preferably combined (merged) using an alpha blending operation (which can be carried out in any suitable and desired manner). This will then have the effect that the desired features in the second texture will be visible where the first texture is transparent, thereby giving the impression of height differences in the displayed image in accordance with the present invention.

Various modifications and improvements to this embodiment may be used, if desired. For example, because the projection can result in a larger area of the second texture being required, a larger area of the second texture (as compared to the first texture) could be made available (fetched from a cache, downloaded, generated, etc.)) for the texturing process. Alternatively or additionally, other techniques such as texture clamping or mirroring mechanisms could be used to compensate for any "missing" parts of the second texture following the mapping to the plane of the primitive (or primitives) to be displayed. Also, if the map is defined using a continuous set of plural primitives, any parts "missing" in the displaced texture could be fetched from adjacent primitives, if desired.

Also, the camera projection mode does not need to be perspective. An orthogonal projection will work just as well.

In a second particularly preferred embodiment of the present invention, the first texture comprises all the map features that are to be displayed, and the second texture is in the form of a texture that contains values which will cause selective regions of the first texture to be modified or modulated, and preferably to be darkened, when the two textures are combined. The second texture is accordingly preferably configured such that it will, when combined with the first texture, cause the regions in the first texture to be shown as map feature borders (edges), such as water edges, for example, to be darkened in the displayed image (but, preferably, to leave the remainder of the first texture unchanged). The second texture in these arrangements can accordingly be thought of as a "modulation map" that will modulate or modify the first texture (preferably its intensity) to display the desired border effects.

Thus, preferably the first texture is a non-transparent texture having the map features (e.g. land and river features) and the second texture is a "modulation map" that can modulate the intensity of the first texture.

In this embodiment, the first and second textures are preferably multiplied together to combine them when rendering the map for display.

The second texture, "modulation map" preferably contains values within a fixed range, preferably between 0.0 and 1.0, and preferably operates to modify (e.g. darken) the first texture only where the second texture has a value lower than the maximum value (such as 1.0) that the second texture can take (such that the second texture should be, and is preferably, configured to have values lower than the maximum value (e.g. lower than 1.0) at locations that should be shown as map feature borders (edges) in the displayed image (but not elsewhere)).

The "modulation map" second texture could be predefined (e.g. for the tile in question). However, in this embodiment, the "modulation map", second texture is preferably derived, dynamically, in use, from a height map that is indicative of the relative heights of the different map features in the first texture to which the modulation map second texture is to be applied. This height map can contain, and preferably does contain, multiple levels of height, thereby allowing a single height map (and thus second texture modulation map) to represent and render for display both lowered areas (e.g. water areas) and raised areas (e.g. buildings).

The height map may be determined in advance and thus stored as a predefined height map (texture) that is to be used as input to rendering process. In this case, the height map could, e.g., be stored as a separate texture, or stored in the alpha-channel of the first texture (if that channel is available and not otherwise being used for the first texture). Alternatively, the height map could be derived in use, e.g. from the colour map data (e.g. and preferably, from the first texture representing the map features, e.g. by analysing the texture and setting all texels in the height map to be "lower" where a corresponding texel in the first texture corresponds to the "water" colour (or the colour of whatever other feature needs to be lower (or higher)).

The height map may, e.g., be derived, e.g., from the colour map data (e.g. from the first texture representing the map features) by mapping particular colours to specified heights (e.g. water colour to a lower height, building colour to a higher height, etc.).

The height map can be used to derive the "modulation map" second texture in any desired and suitable manner. However, in a particularly preferred embodiment, the second texture is derived (computed) from the height map and a displaced version of the height map. The displaced version of the height map is preferably a version of the height map that has been perspectively correctly displaced depending on the view direction. Most preferably, the modulation map, second texture is derived from the height map as follows:

second texture(modulation map)=$H0+(1-H1)$ where:

H0 is the height map and H1 is the displaced height map (and preferably a version of the height map that has been subjected to a perspective correct displacement dependent on the camera position).

The effect of this arrangement should be, and preferably is, such that the resulting modulation map, second texture, will be mostly at its maximum value, except on the "visible edge" side (from the viewers perspective) of map features in the first texture that are to be shown as being lowered or heightened. This arrangement will accordingly provide a modulation map second texture that can have the effect of causing a dark edge to appear only at one side of a lower (or higher) map feature (which is the particularly desired behaviour for the present invention, as discussed above).

Preferably the so-derived modulation map, second texture values are clamped to the maximum value (such as 1.0) permitted for the modulation map, second texture. This will then avoid the modulation map causing lighter edges in the displayed map.

The derived, modulation map, second texture can be used to modulate or modify the display of the first texture as desired. In one preferred embodiment the derived, modulation map, second texture is multiplied with the first texture to modulate (but darken only) the intensities of the edge regions of lower or higher map features in the first texture. Other arrangements, such as using the derived, modulation map, second texture as an input to a function that, e.g., selectively changes or modifies the colour of texels in the first texture, and/or the colour of pixels when the first texture is applied to the primitive, depending upon the value of the derived, modulation map, second texture, could be used, if desired.

Further scaling could be applied to the modulation map, second texture, for example subtraction by 0.5 and multiplication by 2 (where the modulation map values are clamped to the range 0.0:1.0), to obtain higher contrast in the modulation map (and accordingly in the modulated first texture), if desired.

The modulation map, second texture, could in these embodiments be computed in its entirety before it is applied to (used to modulate) the first texture. However, this is not essential, and it could instead, e.g., be computed on-the-fly for each pixel (or set of pixels). For example, for each pixel position a texture look-up in the height map and in the displaced height map could be performed, and then combined to deliver the modulation map value for the second texture on the fly. The computed modulation map value for the second texture could then be used directly to modulate the channels of the colour map first texture.

The (perspective correctly) displaced version of the height map that is used to generate the modulation map to be used as the second texture can be derived in any suitable and desired manner. It is preferably derived in the manner or manners discussed above in relation to displacing the second texture for the first particularly preferred embodiment of the present invention.

Thus, for example, in one particularly preferred embodiment, the position in the displaced height map that corresponds to a respective position in the "non-displaced" height map is determined by perspectively correctly projecting the position in the height map according to the camera view (viewpoint), to a plane that is below (behind) the plane of the height map, and then projecting the projected height map position in the plane that is below (behind) the plane of the height map orthogonally (perpendicularly) back to the "original" plane of the height map. The position in the original plane of the height map that the projected position is orthogonally projected back to is then the position in the displaced height map that corresponds to the respective position in the "non-displaced" height map.

In a third particularly preferred embodiment of the present invention, the first texture again comprises, like for the second particularly preferred embodiment of the present invention described above, all the map features that are to be displayed (and is preferably a colour map representing all the map features that are to be displayed), and the second texture is again used to modulate or modify the display of the first texture in the rendered primitive(s), again preferably so as to cause selected regions of the first texture to be darkened when the first texture is displayed.

However, in this embodiment, the second texture is preferably derived from the first texture, and the so-derived second texture is preferably compared with the first texture to determine the modulation (modification), if any, to be applied to the first texture when it is displayed. In other words, the display of the first texture is preferably selectively modified on the basis of the comparison of the first and second textures (with the second texture being derived from the first texture).

In this particularly preferred embodiment of the present invention, the second texture and the comparison process should accordingly be so as to cause selected regions of the first texture (e.g., and preferably, that are intended to be border regions) to be modified, e.g., darkened. The second texture and comparison process is accordingly preferably configured such that the regions in the first texture to be shown as map feature borders (edges), such as water edges, for example, will be darkened in the displayed image (but, preferably, such that the remainder of the first texture is left unchanged).

Preferably the arrangement will have the effect of causing a dark edge to appear only at one side of a lower (or higher) map feature (which is the particularly desired behaviour for the present invention, as discussed above).

To achieve this, in this embodiment, the second texture is preferably derived as a, preferably perspective correctly, displaced version of the first texture.

This (perspective correctly) displaced version of the first texture that is to be used as the second texture in this embodiment of the present invention can be derived in any suitable and desired manner. It is preferably derived in the manner or manners discussed above in relation to displacing the second texture for the first particularly preferred embodiment of the present invention.

Thus, for example, in one particularly preferred embodiment, the position in the displaced version of the first texture that forms the second texture to be compared with the first texture that corresponds to a respective position in the "non-displaced" first texture is determined by projecting the position in the first texture according to the camera view (and perspectively correctly) to a plane that is below (behind) the plane of the first texture, and then projecting the projected first texture position in the plane that is below (behind) the plane of the first texture orthogonally (perpendicularly) back to the "original" plane of the first texture. The position in the original plane of the first texture that the projected position is orthogonally projected back to is then the position in the displaced first texture that corresponds to the respective position in the "non-displaced" first texture (and so that should be used as the second texture value when comparing the first and second textures).

In these embodiments of the present invention, the comparison process preferably determines if the features for the first texture and for the displaced version of the first texture that forms the second texture at a given pixel position are at the same level (height) or not. If the features are the same level (height) (e.g. both ground level features) then the first texture is displayed unchanged, but if the first texture contains a lower level feature (e.g. water) than the displaced version of the first texture that forms the second texture (and/or vice-versa) for a given pixel position, then the displayed texture for the pixel position is modified so it represents (indicates) an edge.

The "edge" could be represented, as discussed above, by, e.g., darkening the intensity of the first texture at the pixel position in question, or by changing the pixel's colour to an edge colour, such as black or dark blue, etc., as desired. The level comparison could be, and preferably is, based on the colour data for the pixels, for example with "blue" being taken as indicating water, "green" as ground level, etc.

Thus, in this embodiment, the output colour to be displayed for a pixel (for the pixels) of the primitive or primitives representing the map is preferably based on a comparison of the value of the first texture for the pixel(s) in question with the value of a displaced version of the first texture for the pixel(s) in question. In other words, the output pixel colour is preferably based on a comparison of the value of the first texture for the pixel(s) in question with the value for a displaced position in the first texture.

Thus, according to a seventh aspect of the present invention, there is provided a method of displaying map information, preferably using tile-based map information rendering, the method comprising:

determining the output colour to be displayed for a pixel of a primitive representing the map based on a comparison of the value for the pixel in question of a texture to be applied to the primitive to display the map, the texture comprising one or more map features to be displayed for the map, with the value for the pixel in question of a displaced version of the texture.

According to an eighth aspect of the present invention, there is provided a navigation or mapping apparatus, comprising:

a display for displaying a digital map to a user; and a processor configured to access digital map data and cause a digital map to be displayed on the display, preferably using tile-based map information rendering; and characterised by the processor further comprising:

means for determining the output colour to be displayed for a pixel of a primitive representing the map based on a comparison of the value for the pixel in question of a texture to be applied to the primitive to display the map, the texture comprising one or more map features to be displayed for the map, with the value for the pixel in question of a displaced version of the texture.

As will be appreciated by those skilled in the art, these aspects and embodiments of the present invention can and preferably do include any one or more or all of the preferred and optional features of the invention described herein, as appropriate.

Thus, for example, the displaced version of the texture is preferably obtained by projecting, according to the camera view (viewpoint), the first texture to a displaced, "rear" plane, and then projecting the resultant texture in the displaced, "rear" plane, perpendicularly back to the original "plane".

Similarly, the displaced texture co-ordinate whose value is to be used in the comparison is preferably determined by projecting the pixel position of interest to a plane that is displaced below the plane of the primitive according to the camera position, and then projecting the resultant pixel position from the displaced plane orthogonally back to the plane of the primitive representing the map to be displayed. The so-projected pixel position is then used as the position to sample in the texture to compare with the texture value for the pixel position of interest.

The second texture and the comparison process, etc., in these embodiments of the present invention could be derived and performed in any suitable and desired manner. Preferably a pixel shader program is used for this, e.g., to derive the displaced version of the first texture that forms the second texture and to then perform the comparison and to modulate (modify) the first texture value that is displayed (if required).

The second texture (the displaced version of the first texture) is in these embodiments preferably computed on-the-fly for each pixel (or set of pixels). For example, for each pixel position a texture look-up in the first texture map and in the displaced first texture could be performed, and then compared, on the fly.

It would be possible to use the approach of this embodiment of the present invention to simulate reflections of the water edge, e.g., and preferably, by repeating the process of deriving the displaced first texture forming second texture and comparing it to the first texture, e.g. by using a two-pass approach.

A number of other techniques are preferably also used to enhance the quality of the displayed image in the embodiments of the present invention.

For example, in a preferred embodiment, the position (e.g. offset) of the rear "virtual" plane that the textures, etc., are, in effect, projected to in the embodiments of the present invention can be, and preferably is, varied in use (as the image is being displayed), e.g., so as to oscillate between two (or more) positions, e.g., on a frame-by-frame basis. This can be used, e.g., to give the effect of tide or waves when rendering water.

In a particularly preferred arrangement, the position (e.g. offset) of the rear "virtual" plane that the textures, etc., are, in effect, projected to in the embodiments of the present invention can be, and preferably is, selected, preferably automatically, and preferably decreased automatically, as a function of the viewing distance (the viewing distance, measured as a straight line, being the distance from the viewpoint of the user (i.e. the users eye) to the (virtual) point in space where the plane of the map is). This can further help to enhance the displayed image.

In a preferred embodiment, where available, pixel shading operations are used to enhance the image being displayed, preferably to apply effects to particular image regions of the map. For example, pixel shading operations may be used to simulate the reflection of sunlight and/or waves when rendering water features, to create a more realistic water effect.

Although, as will be appreciated from the above, the present invention is particularly suited to displaying features that appear above or below the ground (that appear in ground "faces"), such as building roofs, water features and tunnels, it may equally be used to render other features, and in particular wherever planar surfaces need to have an appearance of depth (such as layers of clouds, for example).

An example of this for map display would be the faces of buildings, for example when displaying city areas. The present invention can be used to give a more realistic display of building faces, as compared, for example, to the typical use of textures that are traditionally used for such display. Moreover, because the rendering of building faces (especially for office buildings) typically uses a repetitive texture, the present invention can be and preferably is, implemented in this case by using a defined texture or textures for a single window, and repeating those textures over the face of the building, thereby making its use very efficient.

The technique of the present invention may similarly be, and preferably is, used to simulate building roofs.

The principles of the present invention in any of its aspects and embodiments are applicable to any form of mapping or navigation apparatus and to the display of any desired and suitable form of map information. In preferred embodiments the apparatus is a navigation apparatus. One particular area of utility is in relation to portable navigation devices (PND). In embodiments, therefore, the mapping or navigation apparatus is a portable navigation device (PND). In accordance with a further aspect, the present invention provides a portable navigation device (PND) comprising the apparatus in accordance with any of the aspects or embodiments of the invention described. Accordingly, in embodiments of the invention, the method is a method of operating a mapping or navigation system of a portable navigation device. The PND may, and preferably does, include one or more other features typical of PNDs, such as, and preferably, an input interface configured to enable a user to interact with and/or control the apparatus and/or device.

The invention is also applicable to navigation apparatus which is provided as part of an integrated navigation system. For example the apparatus may form part of an in-vehicle integrated navigation system. In accordance with another aspect of the invention, the present invention provides a navigation system comprising a navigation apparatus in accordance with any of the aspects or embodiments of the invention described. Accordingly, in embodiments of the invention, the method is a method of operating a navigation apparatus of a navigation system. The navigation system may be an integrated in-vehicle navigation system.

Regardless of its implementation, a navigation apparatus of the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the mapping or navigation apparatus may be implemented by means of an application of a processing device which does not form part of a specific mapping or navigation device. For example the invention may be implemented using a suitable computer system arranged to execute mapping or navigation software. The system may be a mobile or portable computer system e.g. a mobile telephone or laptop, or may be a desktop system.

Indeed, the present invention may also be used advantageously in higher end systems, such as desktop systems, if desired. For example, although on a high-end system a high-performance graphics accelerator may be able to render building faces in detail using high vertex models, the techniques of the present invention may be used, for example, for the regions of the image that are further from the viewer where high levels of detail and accuracy may be less important, with the "full" 3D, high-detail, high-vertex models still being used for the nearer regions of the image, thereby allowing a trade-off between relative efficiency and desired image quality.

Although the present invention has been described above with particular reference to map information rendering and in particular to tile-based map information rendering, the techniques of the present invention may be applied to other techniques for rendering map information, and indeed, to the rendering of other images, if desired.

For example, the techniques of the present invention could equally be used to provide enhanced map information display when rendering maps using vector graphics or triangle meshes, etc. In this case the technique of the present invention would be implemented by, for example, by representing the image as a "layer" in the 3D world representation of the map information, and then applying textures having appropriate image regions and border regions to the image layer, in the manner discussed above. (Thus, in effect, the layer would correspond to the tile discussed above.)

Equally, the technique could be used when rendering images other than map information. For example, as discussed above, the present invention may advantageously be used when displaying buildings, and this need not simply be in the context of map information, but could be used for the display of buildings in other contexts, for example in games or other applications.

Thus, according to a further aspect of the present invention, there is provided a method of displaying an image, comprising:

using a first graphics texture comprising one or more features to be displayed for the image in combination with a second graphics texture to apply a texture to a graphics primitive or primitives representing the image to be displayed in order to display the image; and displaying the graphics primitive or primitives representing the image having the applied texture to display the image; wherein:

the second texture and the combining operation are configured such that using the first texture in combination with the second texture causes at least one image feature being displayed to be bordered by a border region that represents a border to that feature.

According to a further aspect of the present invention, there is provided an apparatus for displaying an image, comprising:

means for using a first graphics texture comprising one or more features to be displayed for the image in combination with a second graphics texture to apply a texture to a graphics primitive or primitives representing the image to be displayed, in order to display the image; and means for displaying the graphics primitive or primitives representing the image having the applied texture to display the image; wherein:

the second texture and the combining operation are configured such that using the first texture in combination with the second texture causes at least one image feature being displayed to be bordered by a border region that represents a border to that feature.

According to a further aspect of the present invention, there is provided a method of displaying an image, comprising:

applying a first texture to a graphics primitive or primitives representing the image to be displayed, the first texture comprising one or more features to be displayed for the image;

combining the first texture applied to the graphics primitive or primitives representing the image with a second texture to be applied to the graphics primitive or primitives representing the image; and displaying the graphics primitive or primitives representing the image having the applied combined first and second textures to display the primitives to display the image; wherein:

the second texture and the combining operation are configured such that the combined textures cause at least one image feature being displayed to be bordered by a border region that represents a border to that feature.

According to a further aspect of the present invention, there is provided an apparatus for displaying an image, comprising:

means for applying a first texture to a graphics primitive or primitives representing the image to be displayed, the first texture comprising one or more features to be displayed for the image;

means for combining the first texture applied to the graphics primitive or primitives representing the image with a second texture to be applied to the graphics primitive or primitives representing the image; and means for displaying the graphics primitive or primitives representing the image having the applied combined first and second textures to display the primitives to display the image; wherein:

the second texture and the combining operation are configured such that the combined textures cause at least one image feature being displayed to be bordered by a border region that represents a border to that feature.

According to a further aspect of the present invention, there is provided a method of displaying an image, the method comprising:

determining the output colour to be displayed for a pixel of a primitive representing the image based on a comparison of the value for the pixel in question of a texture to be applied to the primitive to display the image, the texture comprising one or more image features to be displayed for the image, with the value for the pixel in question of a displaced version of the texture.

According to a further aspect of the present invention, there is provided an apparatus for displaying an image, comprising:

means for, determining the output colour to be displayed for a pixel of a primitive representing the image based on a comparison of the value for the pixel in question of a texture to be applied to the primitive to display the image, the texture comprising one or more image features to be displayed for the image, with the value for the pixel in question of a displaced version of the texture.

As will be appreciated by those skilled in the art, these aspects and embodiments of the invention can and preferably do include any one or more of the preferred and optional features of the invention described herein, as appropriate. Thus, for example, the image to be displayed preferably represents map information.

The methods in accordance with the present invention may be implemented at least partially using software e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

Like reference numerals are used for like features throughout the drawings.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to display map information (and preferably to execute navigation software so as to provide route planning and navigation functionality). It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
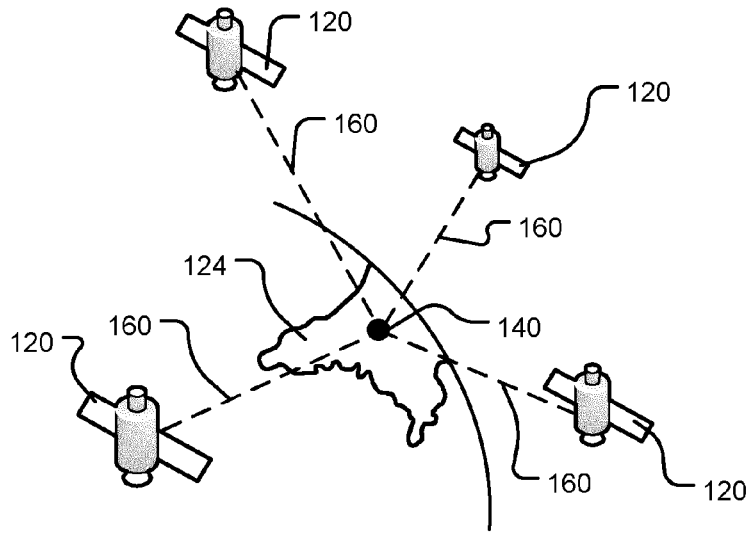
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
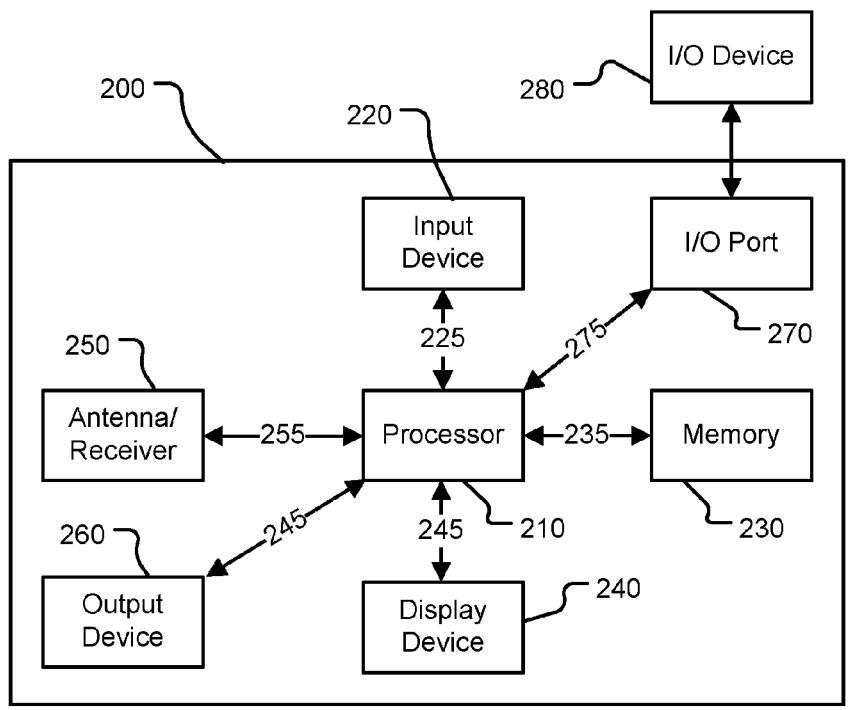
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
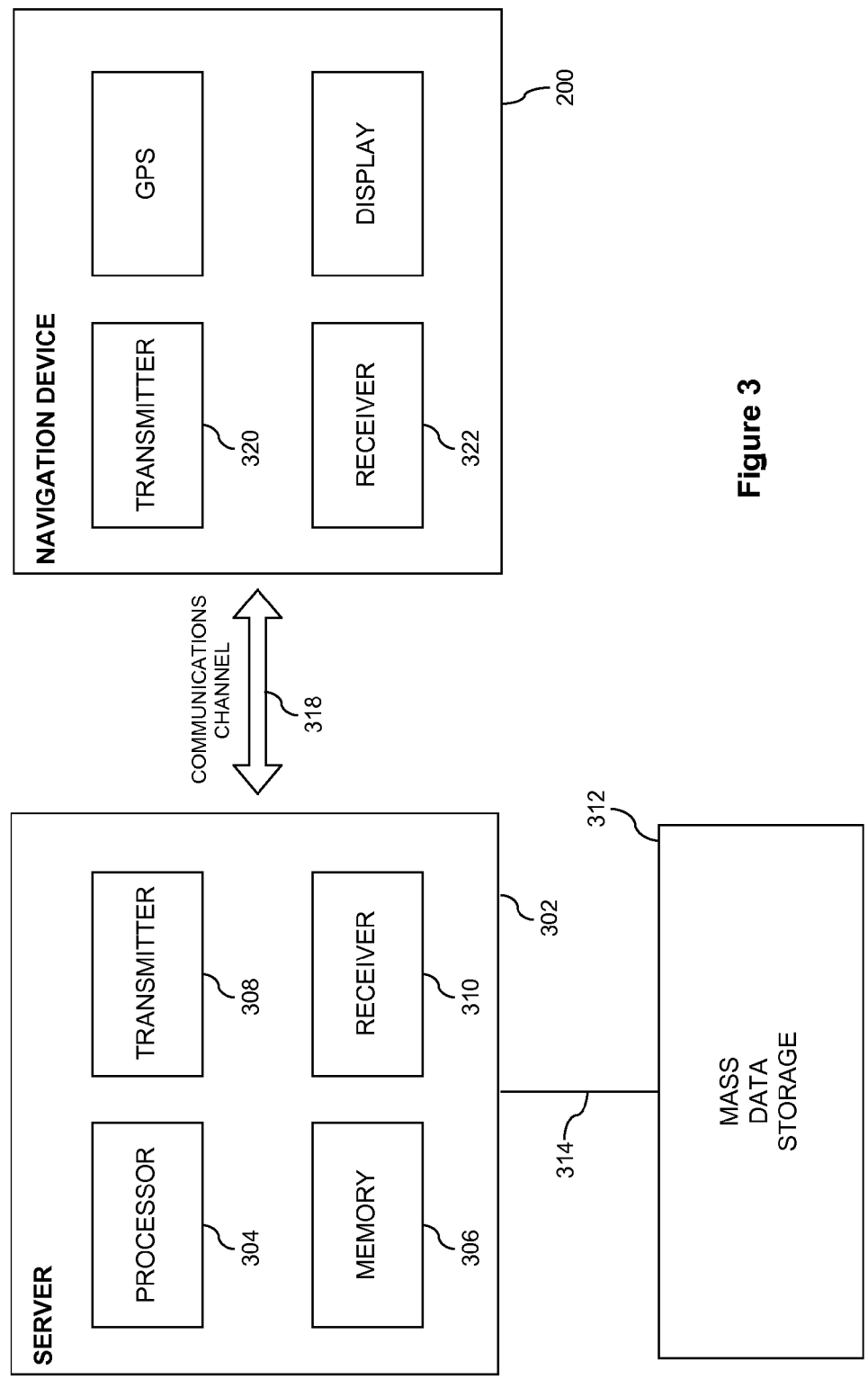
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as GPRS, the data protocol standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
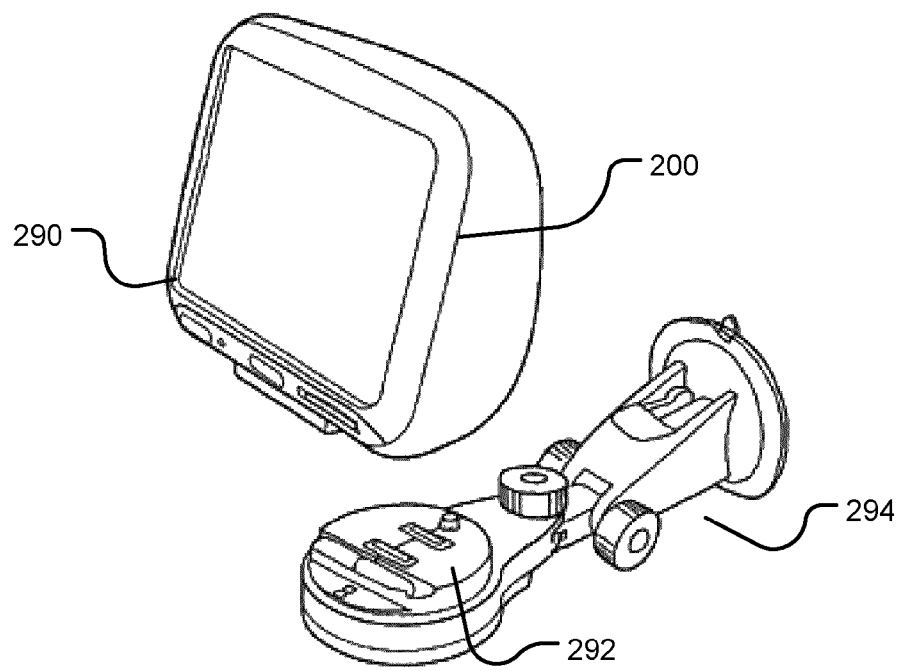
FIGS. 4A and 4B are illustrative perspective views of a navigation device.
Figure 4B:
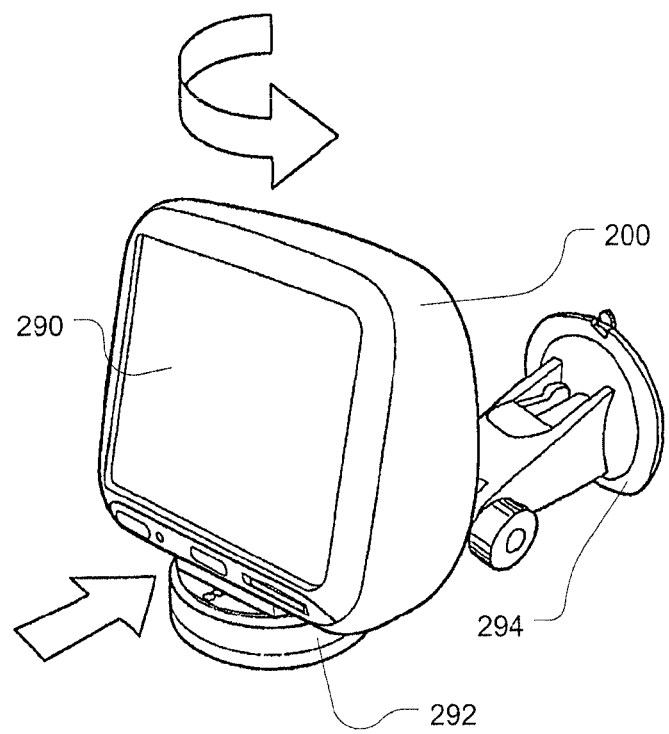

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc.

using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

As discussed above, an important aspect of the operation of the navigation device 200 of the present embodiment is to display map information to a user on its display screen 240. The map information will be displayed, e.g., in response to a users inputs, under the control of the processor 210. To facilitate this, the processor 210 includes a graphics processor that renders the desired images for display in response to appropriate graphics commands and data generated by the processor 210.

In common with many navigation devices, the navigation device 200 of the present embodiment uses tile-based road network rendering for displaying the map information to a user on the display screen 240. Thus, the graphics processor of the processor 210 renders the map information to be displayed by depicting the map information as tiles in 3D space, which tiles are then projected to 2D screen space when the image is actually displayed.

The present embodiment provides an improved method for such tile-based road network rendering which can, inter alia, provide improved display of features that are above and/or below a reference plane, such as water features.

Figure 5A:
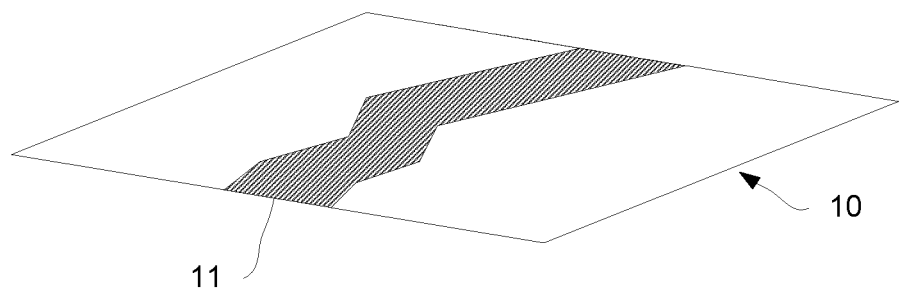
FIG. 5 shows schematically the rendering technique of the present invention.
Figure 5B:
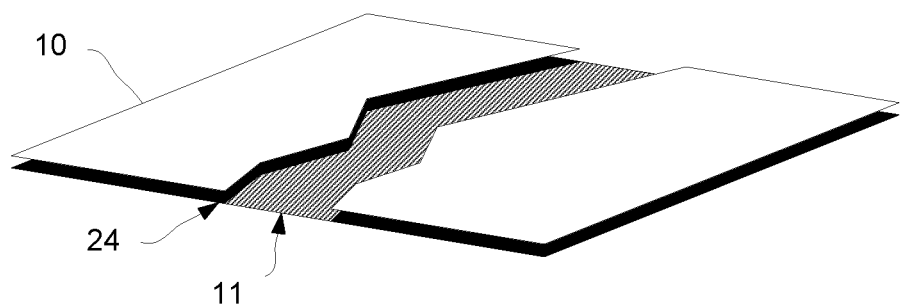

FIG. 5 illustrates the improved technique of the present embodiment. FIG. 5a shows a 3D world space tile 10 containing a water feature 11 (in this example, a river) that has been rendered coplanar to the ground surface (to the plane of the tile 10). This can give a dull and unrealistic appearance. FIG. 5b shows the same image but rendered in accordance with the present invention. As can be seen, this provides an improved appearance for the tile in question.

As shown in FIG. 5b, in the present invention the image is rendered such that the water feature 11 in the tile 10 is bordered by a border colour 24. The border colour 24 accordingly appears as a darker edge at the edge of the water feature 11. The effect of this is that the water feature 11 appears as though it is below the plane of the tile 10 when the image is displayed, thereby providing, as shown in FIG. 5b, an enhanced appearance compared, e.g., to the arrangement shown in FIG. 5a where the water feature 11 appears to be coplanar with the tile 10.

Three preferred embodiments for achieving the rendering effect shown in FIG. 5b will now be described.

In the first preferred embodiment of the present invention, two textures are rendered in the same plane (associated to the same surface) and combined to achieve the desired visual effect. A first texture shows, e.g. ground level map features, such as fields and roads, and has see-through (transparent) regions (shapes) where map features, e.g. water, in the second texture are to appear. This first texture is then combined with a second texture that has map features, such as water, that are to be shown at a different level (e.g. lower, in this case), bordered by dark border regions. As will be discussed further below, after perspective-correct displacement of the second texture, the textures are combined using a combine operation such as alpha-blending according to the transparency of the first texture. FIG. 6 illustrates this.

Figure 6A:
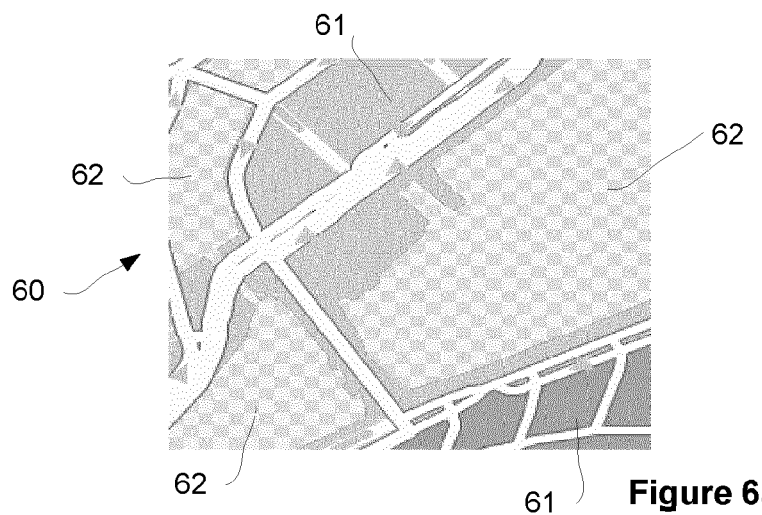
FIGS. 6, 7 and 8, show a first preferred embodiment for implementing the rendering technique of the present invention.

FIG. 6a shows a first texture 60 having ground level features 61 and transparent regions 62 (marked with a checkerboard pattern for illustration purposes) where water features are to appear.

Figure 6B:
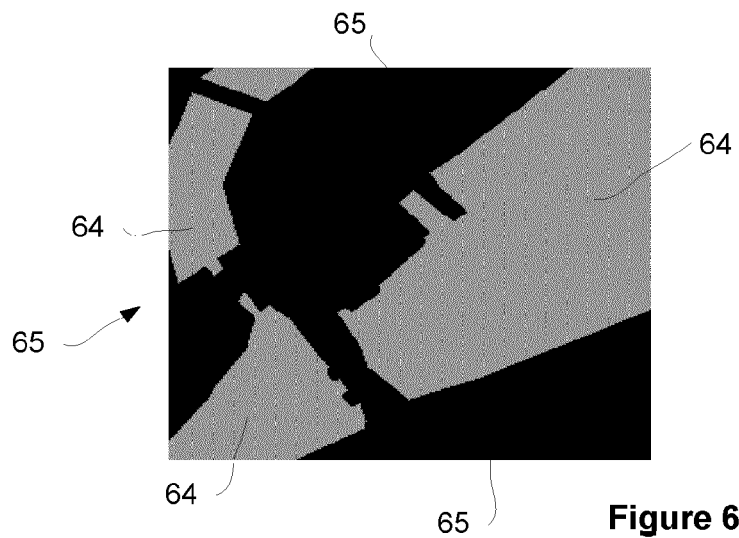

FIG. 6b shows a second texture 63 having water features 64 bordered by darker border regions 65.

Figure 6C:
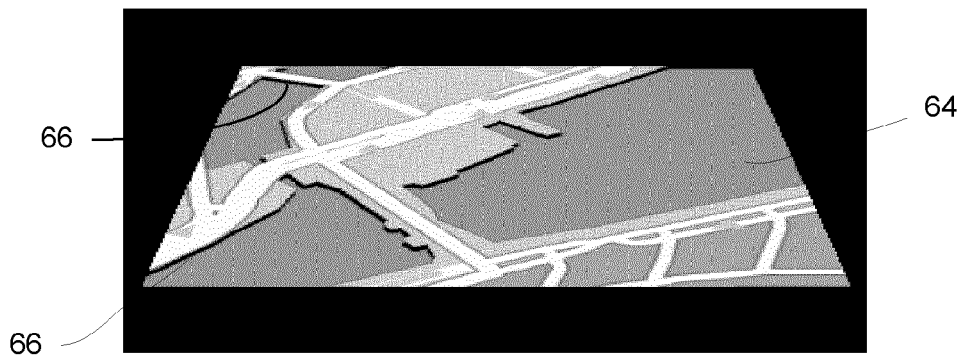

FIG. 6c shows the image 66 achieved when the textures of FIGS. 6a and 6b are combined in the manner of the present embodiment on a 3D map tile. As can be seen, the water features 64 of the second texture 63 are seen in the transparent regions 62 of the first texture 60. However, the border regions in the second texture 63 are also seen as darker edges 66 to the water features 64, thereby giving the impression of depth.

The technique for achieving these rendering effects using the two textures will now be described.

Figure 7:
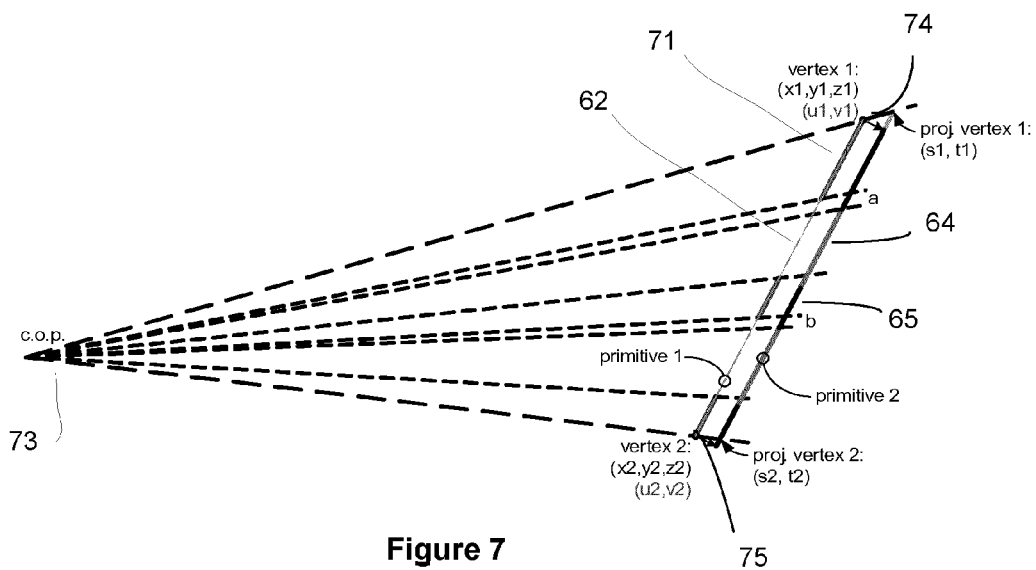

FIG. 7 shows the basic principles of the technique.

FIG. 7 shows a cross section of a perspective view looking, in effect, at a first map tile 71, and a second, displaced map tile 72. Each tile 71 and 72 is represented by graphics primitive (e.g. a quadrilateral or triangle) that is displaced along an angle perpendicular to the plane. The Figure is a cross-section showing a first vertex (vertex 1) 74 and a second vertex (vertex 2) 75 for the primitive representing the first tile 71. The line between these vertices is an edge of the primitive.

FIG. 7 also shows the camera position 73 (center of projection (c.o.p.)).

If in this arrangement, the first texture containing the transparent areas 62 which coincide with the desired lowered areas such as water is rendered on the top tile 71 (on primitive 1) and the second texture containing e.g. the water areas 64 in blue and the border areas 65 in black is rendered on the bottom tile 72 (primitive 2), then the blue "water" parts and a small black edge of the border parts (indicated with "a" and "b" in FIG. 7) in the second texture will be seen through the transparent areas 62 of the first texture on the top tile 71 (on primitive 1). The effect of this will be that the black colored border areas a and b will appear as a dark edge around the water, which gives the illusion of a height difference.

(In effect, the second texture is being rendered as if to appear behind and slightly offset relative to the front, first texture, such that the water feature and its corresponding border on the second texture can be seen through the see-through shape (transparent region) in the first texture, thereby giving a more visually appealing depiction of the water feature.)

Figure 8:
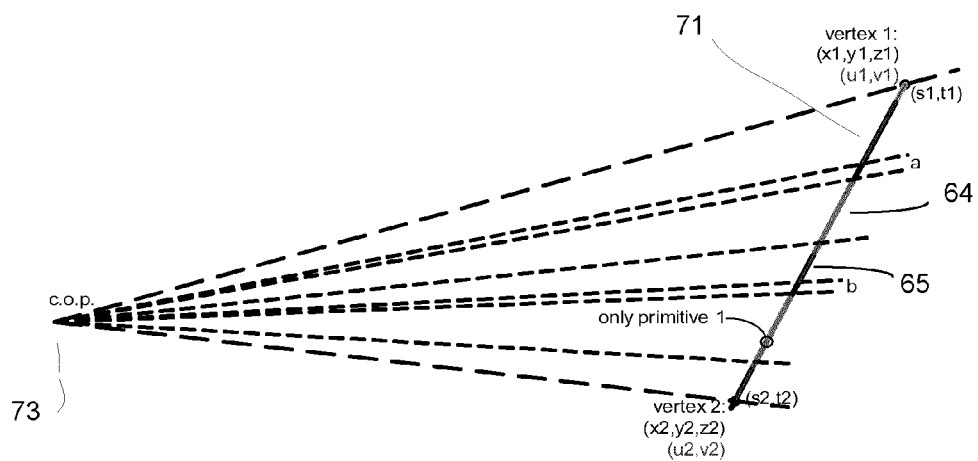

The present embodiment achieves this rendering effect by applying the two textures to a single primitive (tile) (to a single layer of primitives). FIG. 8 illustrates this and shows both the first and second textures of FIG. 7 attached to the same plane of primitive 1 (i.e. applied to the same primitive). However, the second texture has been transformed, i.e. displaced and minified, according to a perspective projection that has the effect of mapping the second texture as if from the plane of the rear tile (of primitive 2) shown in FIG. 7 to the plane of primitive 1 according to the projection of the camera. This achieves the same visual result as is obtained in the FIG. 7 arrangement.

In the present embodiment, in order to derive the transformed second texture for applying to the primitive (i.e. in order to obtain the view-dependent perspective-correct displacement of the second texture), the relevant coordinates in the texture space of the second texture to be used for the vertices of the primitive are derived. To do this, the vertex coordinates in the texture space (s,t) of the second texture as if it were applied to the rear primitive 2 at the projected vertices of primitive 1 in the plane of the rear primitive 2 are obtained.

To obtain the vertex coordinates in the texture space (s,t) of the second texture at the projected vertices of primitive 1 in the plane of the rear primitive 2, the world space (x,y,z) vertices of primitive 1 are, as shown in FIG. 7, (perspectively correctly) projected onto the texture plane of primitive 2 (i.e. as if the second texture is being applied to the primitive 2 shown in FIG. 7 that is displaced behind the tile (primitive 1)). The projection is along the line through the vertices 74, 75 and through the center of projection (c.o.p.) 73 (which is illustrated by the top and bottom dashed lines in FIG. 7). The position where the projection intersects the texture space (s,t) of primitive 2 determines the new (s,t) coordinates to be associated, as a second texture coordinate attribute, to the vertices 74, 75 of primitive 1. Then, the texture of primitive 2 is bound as a secondary texture of primitive 1 using the newly obtained (s,t)-texture space vertex coordinates (s1, t1; s2, t2).

By using the newly obtained vertices in (s,t) texture space which are associated to the vertices of primitive 1, a (perspective correct) displacement, including minification (scaling), of the second texture is obtained, not only at the vertices, but also along the interior surface of the second texture. (Perspective correct interpolation along the surface attributes (such as texture coordinates) of a primitive is a commonly available feature in a 3D graphics rendering pipelines such as OpenGL.)

Then, to render the single primitive with both textures applied, the displaced second texture can be bound to primitive 1 with the obtained (s,t) texture vertex coordinates (s1, t1; s2, t2) assigned to the associated vertices of the primitive 1 as the second texture coordinate pair to be used when applying the second texture when rendering the primitive.

Other methods may also be used to obtain the perspective-correct displacement of the second texture. For example, normal vectors could be used to do this. In this case, for each vertex of primitive 1 the normal vector could be computed and normalized to a unit length. The normals should then be scaled by multiplying with a scalar to a desired length (which length can be thought of as corresponding to the offset between primitive 1 and primitive 2). Subsequently the scaled normal vector is projected onto the plane of primitive 1 (or more correctly put, projected onto the texture space of the second texture coinciding with the plane of primitive 1). The two delta components s and t of the scaled normal projection will then indicate the displacement of the (s,t) texture space vertices.

Once the displaced version of the second texture has been determined, the two textures should be combined on the primitive (or primitives) to display the map tile. This is done in this embodiment by merging the textures using an alpha blending operation. Thus, the first texture, containing the transparent areas (e.g. at the river areas) is alpha blended with the second texture which accordingly only becomes visible where the first texture is transparent. Because of the displacement dependent on the camera view of the second texture (which has, e.g. blue rivers and the rest dark), the dark parts of the second texture become visible as edges to the water features, resulting in the impression of a height difference.

3D graphics pipelines such as OpenGL or Direct3D™ can offer different hardware accelerated support for combining textures. For this, both older "fixed-function" texture combiners could be used or more recent programmable pixel shader hardware could be used.

It should be noted that in this embodiment, because a larger area of the second texture can be fetched than originally was glued to primitive 2 (see the extrapolation at the top in FIG. 7) it might be beneficial to have a larger part of the second texture actually available. However, it might also be sufficient to use a texture clamping or mirroring mechanism to deal with these texture extrapolations (e.g. if artifacts are acceptable).

Also, in the context of having a continuous set of primitives on a plane (or surface) the parts missing in the displaced texture could be fetched from adjacent primitives since the part that is "lacking" at one primitive should be exactly the part which is "remaining" at the adjacent primitive.

Also, the camera projection mode does not need to be perspective. An orthogonal projection will work just as well.

It would also be possible to render the edges of the see-through shapes (transparent regions) in the first texture to be semi-transparent. By applying semi-transparency to the edges of the see-through shapes in the first texture, hard lines in the rendered image can be avoided.

A second particularly preferred embodiment of the present invention will now be described with reference to FIGS. 9 to 13.

This embodiment again uses two textures and uses the same method for view dependent displacement of a second texture map as described in the first embodiment. However, the nature of the two textures is different, as is the combining operation of the first texture map and the second texture map.

In this second embodiment, the first texture is a colour map that shows all the map features to be displayed.

The second texture map is in the form of a "modulation map" in the form of a 'dark map', which contains values between 0.0 and 1.0, which are multiplied with the first texture, darkening it (modulating its intensity) only where a value lower than 1.0 appears. (Thus, in this embodiment, a multiplication instead of an alpha blending operation is used to combine the first and second textures.) The dark map second texture is configured to contain values lower than 1.0 at places corresponding to map feature edges (e.g. water edges).

Figure 9A:
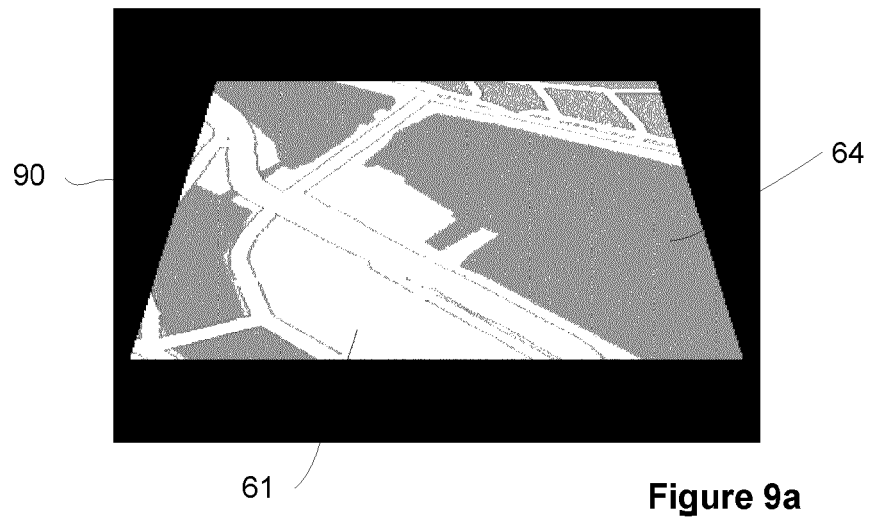
FIGS. 9 to 13 show a second preferred embodiment for implementing the rendering technique of the present invention.
Figure 9B:
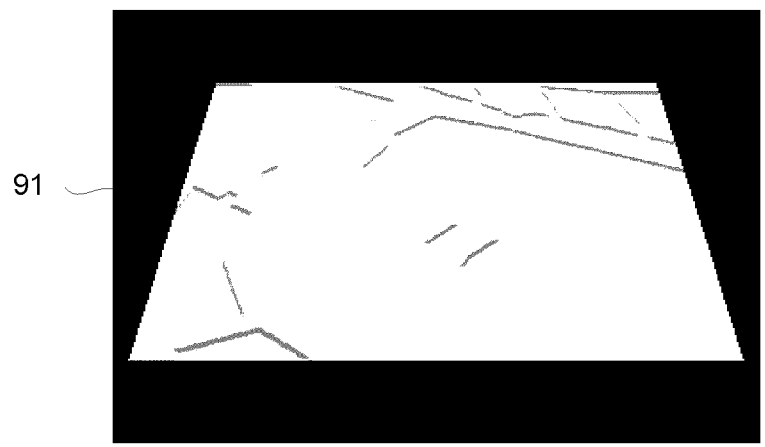
Figure 9C:
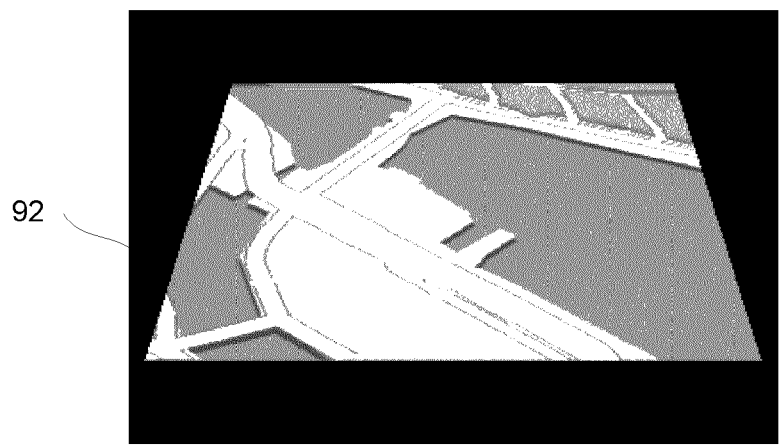

FIG. 9 illustrates this. FIG. 9a shows the colour map first texture 90. FIG. 9b shows the dark map second texture 91. FIG. 9c shows the image 92 produced by combining the first texture 90 and the second texture 91. Again, the effect is that different level features are shown as having darker edges, thereby giving the impression of depth.

Figure 10:
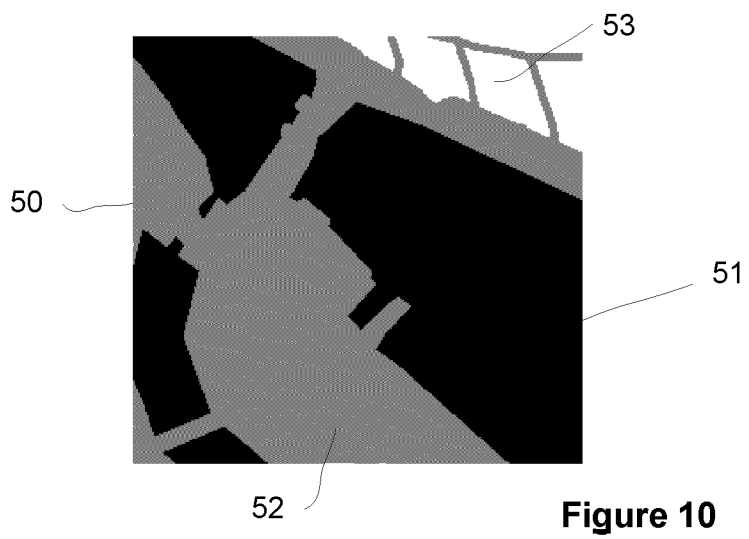

The dark map second texture 91 in this embodiment is dynamically derived from a height map that is an input texture to the method. The height map is derived from the color map data, by mapping texture colors to a specified height (water color is lower, building color is higher, etc.). A height map 50 is illustrated in FIG. 10 and shows different height values for water features 51, ground level features 52 and raised features (e.g. buildings) 53. The height map 50 can contain multiple levels of height, which means that a single height map can provide edges not only at lowered areas (e.g. water areas) but concurrently also at heightened areas (e.g. building areas).

The height map may be stored, e.g., in the alpha-channel (as could the "dark map" if desired), with the colour map first texture being stored in the RGB channels, of a single RGBA texture.

The dark map second texture is derived in this embodiment on-the-fly from the height map combined with a displaced version of the height map. The displaced version of the height map is the height map (perspectively correctly) displaced according to the view direction. (This is somewhat similar to the way that emboss maps are derived. However, for an emboss map the displacement is dependent on the position of a light source, whereas for the dark map second texture of this embodiment it is dependent on the camera position. Also, the height map and the displaced height map are combined differently.)

Figure 11:
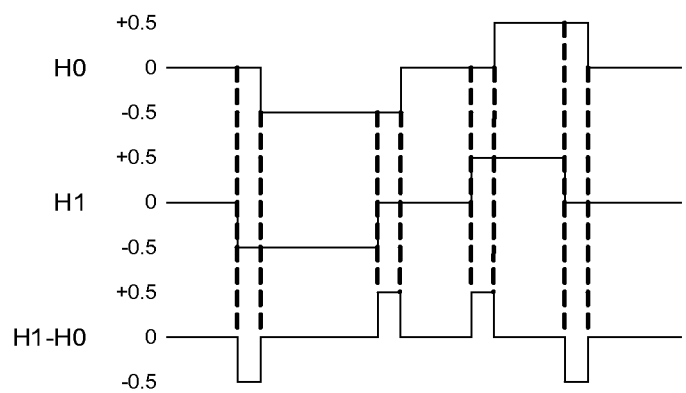

The outline procedure to obtain the dark map to be used as the second texture is as follows and is illustrated in FIG. 11. If the height map values, which could for example be an 8-bit valued bitmap, are interpreted in the range between −0.5 and +0.5, where 0 is shown as medium grey, −0.5 as black and +0.5 shown as white, then the height map (H0) subtracted from the displaced (view dependent) height map (H1) will obtain zero everywhere where the height is the same. Only on height discontinuities (edges of lowered water areas or heightened building areas) will a non-zero value (darker or lighter edge) appear.

In the present embodiment, the ranges of the height map are interpreted not between [−0.5; +0.5] but between [0.0; 1.0] (which is, e.g., how OpenGL deals with texture map values). To obtain the desired behavior of only a dark edge at one side of a lowered or heightened area, the dark map is computed according to H0+(1−H1), where H0 is the height map, stored as e.g. an 8-bit deep bitmap in the alpha-channel of a texture, and H1 is the same height map but displaced. The resultant values are clamped to 1.0 (which is normal behavior of OpenGL) to avoid lighter edges.

Figure 12:
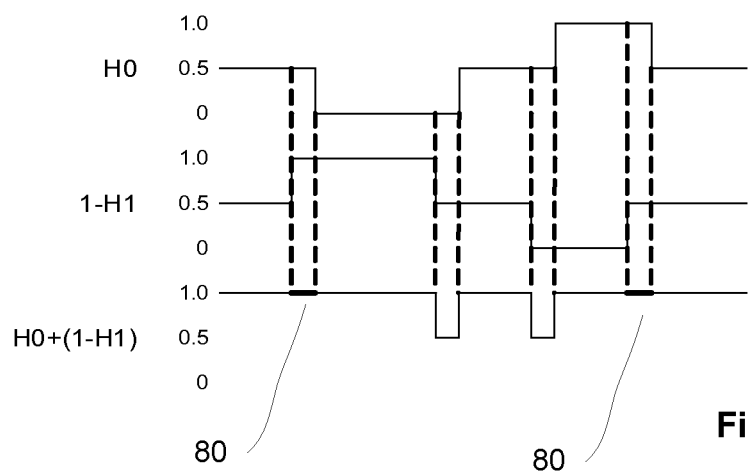

FIG. 12 illustrates this. As can be seen from FIG. 12, the resulting dark map signal value (H0+(1−H1)) is mostly at its maximum value of 1.0 except on the 'visible edge' side of the lowered or heightened areas. (The lines 80 show where the dark map output value has been clamped to 1.0.) This dark map second texture can accordingly be multiplied with the color map first texture to modulate (darken only) the intensities of the first texture at the desired border regions (edges).

The displaced height map, H1, is, as discussed above, a perspectively correctly displaced, according to the camera position, version of the original height map H0.

The (perspective correctly) displaced version H1 of the height map that is used to generate the dark map to be used as the second texture can be derived in any suitable and desired manner. It is preferably derived in the manner or manners discussed above in relation to displacing the second texture for the first particularly preferred embodiment of the present invention.

Thus, in this embodiment, the position in the displaced height map H1 that corresponds to a respective position in the "non-displaced" height map H0 is determined by projecting the position in the height map H0 according to the camera view (and perspectively correctly), to a plane that is below (behind) the plane of the height map H0 (of the tile that is being displayed), and then projecting the projected height map position in the plane that is below (behind) the plane of the height map orthogonally (perpendicularly) back to the "original" plane of the height map H0 (of the tile that is being displayed). The position in the original plane of the height map H0 (of the tile that is being displayed) that the projected position is orthogonally projected back to is then the position in the displaced height map H1 that corresponds to the respective position in the "non-displaced" height map.

Further scaling could be applied on the resultant dark map, if desired. For example subtraction by 0.5 and multiplication with 2 could be performed to obtain a higher contrast in the dark map and finally in the modulated color map.

The dark map second texture does not need to be available as a pre-computed texture since the required value can be computed on-the-fly. For each pixel position, a texture look-up in the height map and a texture look-up in the displaced height map can be performed and combined to deliver the dark map value on-the-fly. Subsequently, this computed dark map value can be used directly to modulate the channels of the color map first texture.

For example, the dark map and the multiplication with the color map can be obtained using OpenGL ES 1.1 functionality and a 3-stage multi-texture combiner capable hardware (at maximum throughput) as follows:

```
// TEXTURE-UNIT #0
    glActiveTextureARB(GL_TEXTURE0_ARB);
    glEnable(GL_TEXTURE_2D);
    glBindTexture(GL_TEXTURE_2D, colorAndHeightMap); // H0 height map in A-channel
    glTexEnvf (GL_TEXTURE_ENV, GL_TEXTURE_ENV_MODE, GL_COMBINE_EXT);
    glTexEnvf (GL_TEXTURE_ENV, GL_OPERAND0_RGB_EXT, GL_SRC_ALPHA); // H0 height map
copied to RGB
    glTexEnvf (GL_TEXTURE_ENV, GL_COMBINE_RGB_EXT, GL_REPLACE);
    // TEXTURE-UNIT #1:
    glActiveTextureARB(GL_TEXTURE1_ARB);
    glEnable(GL_TEXTURE_2D);
    glBindTexture(GL_TEXTURE_2D, colorAndHeightMap); // H1 (same as H0, but will be displaced)
    glTexEnvf (GL_TEXTURE_ENV, GL_TEXTURE_ENV_MODE, GL_COMBINE_EXT);
    glTexEnvf (GL_TEXTURE_ENV, GL_OPERAND0_RGB_EXT, GL_ONE_MINUS_SRC_ALPHA); //
1-
H1
    glTexEnvf (GL_TEXTURE_ENV, GL_COMBINE_RGB_EXT, GL_ADD); // H0 + (1-H1)
    // TEXTURE-UNIT #2:
    glActiveTextureARB(GL_TEXTURE2_ARB);
    glDisable(GL_TEXTURE_2D);
    glBindTexture(GL_TEXTURE_2D, colorAndHeightMap); // color texture in RGB channels
    glTexEnvf (GL_TEXTURE_ENV, GL_TEXTURE_ENV_MODE, GL_MODULATE);
```

The resulting fragment of the last texture unit can be passed on for further processing and may finally be written or blended into the frame buffer.

Figure 13:
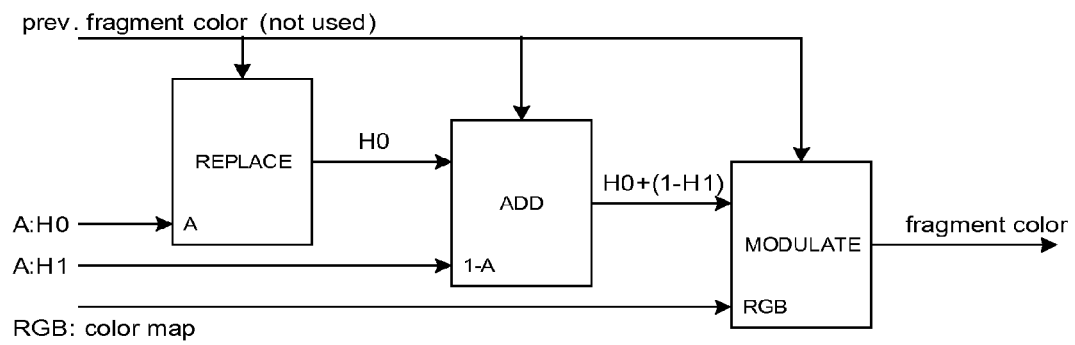

FIG. 13 illustrates the above code graphically in a block diagram.

This process could be implemented, e.g., using the fixed-function texture combiners such as for example found in OpenGL ES 1.1, or on programmable pixels shader DSPs supported by more modern hardware including but not limited to OpenGL ES 2.0.

This embodiment has the advantage that both the color map and the height map can fit into a single RGBA texture. This will result in less texture bandwidth requirements than the first embodiment which requires an RGBA and an RGB (or RGBA) texture. An advantage of the first embodiment is that by having RGB channels available for the background second texture, the edge (border) color does not have to be limited to an intensity modulation of the color first texture: it can be chosen freely.

A third preferred embodiment of the present invention will now be described with reference to FIGS. 14 to 16. This embodiment exploits more programmable hardware, such as pixel (fragment) shaders. It uses a, e.g. pixel shader, program to determine a local displacement and to thereby selectively darken the color on an area (map feature) border.

This third embodiment works by calculating an output pixel color based on comparing a first look-up value in a source texture (e.g. that is on the ground plane) with a second look-up value from the same source texture from a displaced position. Depending on the comparison (e.g. a first look-up value representing water and a second look-up value being next to the water), a corresponding modulated output pixel value is (selectively) produced.

Thus, in this embodiment the first texture is a colour map showing all the desired map features, and the second texture it is combined with is a displaced version of that colour map first texture.

The displacement of the first, source texture to form the second texture can be obtained by exactly the same methods as explained above in relation to the first embodiment.

For example, the displaced version of the first texture can be obtained by projecting, according to the camera view, the first texture coordinates to a rear "virtual plane" 40 and then projecting the resulting positions perpendicular back to the "ground plane" 41. FIGS. 14 and 15 illustrate this.

Figure 14:
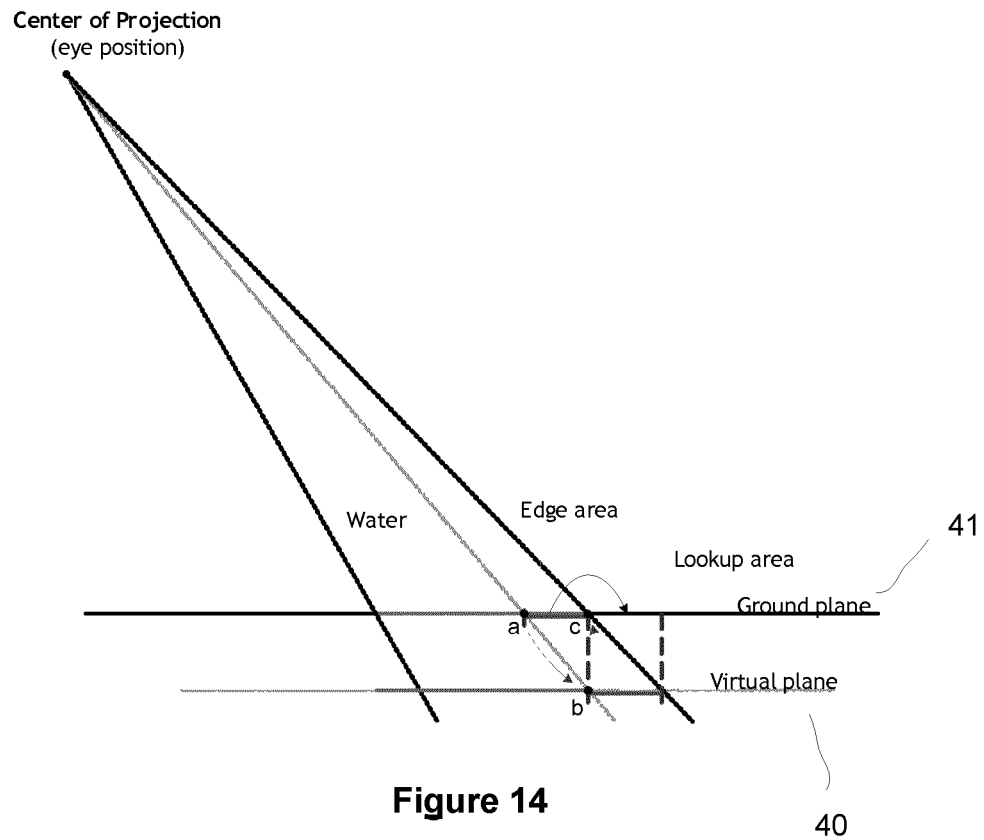
Figure 15:
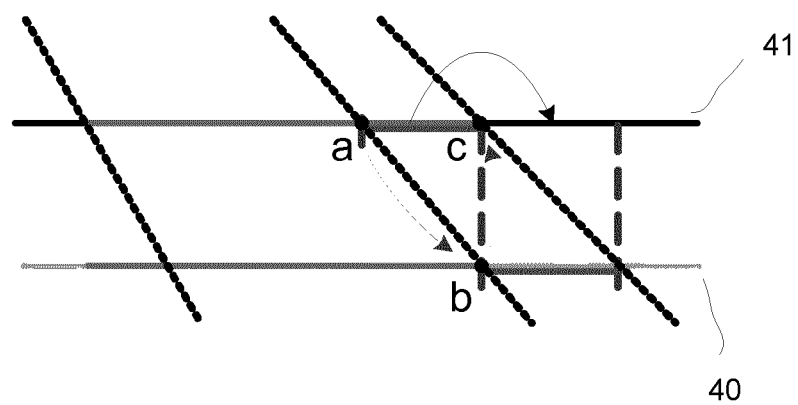

Thus, referring to FIGS. 14 and 15, for each sample coordinate (a) in the ground plane 41 under first texture, a displaced texture coordinate (c) to be used as the displaced, second texture value for the sample coordinate (a) is calculated by calculating the position of sample coordinate (a) as if the ground plane were displaced a certain distance under the ground plane (i.e. to a virtual plane 40). If both planes were actually present, input coordinate (a) would be at position (b). Projecting virtual input coordinate (b) orthogonally back onto the ground plane 41 gives coordinate (c), which is the position in the displaced version of the first texture that corresponds to (and should be compared with) the position (a) in the (undisplaced) first texture to determine the output pixel's value.

Figure 16:
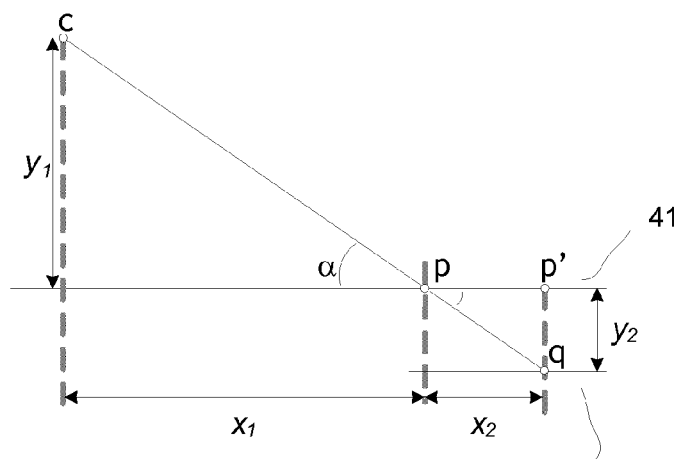
FIGS. 14 to 16 show a third preferred embodiment for implementing the rendering technique of the present invention.

FIG. 16 shows how to calculate the position of the displaced coordinate (labelled p' in FIG. 16). As shown in FIG. 16, the position of displaced coordinate p' to be derived for coordinate p by projecting p onto the virtual plane 40 giving coordinate q may be calculated as follows:

$$p' = p * (x_2 + x_1)/x_1$$

where $x_2$ is given by $$y_1/x_1 = y_2/x_2 \Leftrightarrow$$

$$x_2 = y_2/(y_1/x_1) \Leftrightarrow$$

$$x_2 = x_1/y_1$$

where the virtual plane 40 is a distance $y_2$ below the first (ground) plane 41.

To combine the textures, the texture values from the first, source texture, and from the displaced, second texture, at a given pixel are compared (i.e. the values at (a) and (c) in the first texture shown in FIG. 14 are compared), and then the output pixel value indicated by the first texture selectively modified, based on the comparison (and in particular, to display an edge (or not), depending on the result of the comparison).

For example, if the texture coordinate (a) samples the first, source texture to a value representing 'water' (or another feature that needs to have the appearance of being below the ground plane) and the displaced sample at coordinate (c) in the second, displaced, version of the first texture does not represent a 'water' value, the output sample is modified so that it represents an edge (e.g. by replacing it with a fully black sample or modulating the first texture look-up to make it darker, etc.).

Exemplary GLSL-like fragment shader program pseudo-code for implementing this embodiment is shown below:

```
vec2 CalculateDisplacedCoord(in vec2 sourceCoordinate)
{
    // Return position of ground plane coordinate (a)
    // projected onto a virtual plane coordinate (b) on the ground plane (c)
    // based on the viewing position
}
void main()
{
    // Sample input texture
    vec3 inputColor = texture2D(inputTexture, inputTextureCoord);
    if (inputColor == COLOR_OF_WATER) // is water?
    {
        // Calculate displaced coordinate (c)
        vec2 virtualCoord = CalculateDisplacedCoord(inputTextureCoord);
        // Sample input to get color value at coordinate (c)
        vec3 virtualColor = texture2D(inputTexture, virtualCoord);
        if (virtualColor ≠ COLOR_OF_WATER)
        {
            // Set output color (remap water to edge color or darken, etc.)
            gl_FragColor = COLOR_OF_EDGE;
        }
    }
}
```

This embodiment could also be used to simulate reflections of the water edge if, e.g., a two-pass approach is used.

This embodiment requires programmable hardware shaders, whereas the two previous embodiments would work both with fixed function texture combiners and with programmable shaders. An advantage of this third embodiment is that it requires less storage and associated texture data traffic.

As this third embodiment is based on color comparison, it may be mainly useful for uniform areas of "water". Also, due to e.g. antialiasing techniques color samples may have different (i.e. blended) values at the water boundaries and could be handled separately to avoid visual artifacts, if required.

The fragment shader may be extended to generate, e.g., the appearance of waves in the output stage. This could facilitate use of an input-texture with uniform "water" areas.

Although the present invention has been described above primarily with reference to the display of water features, as will be appreciated by those skilled in the art, as well as being used to display water features, the present invention can be used advantageously to display other below ground level features, such as tunnels, and can equally be used to display above ground level features, such as the roofs of buildings.

Also, as well as being able to efficiently render features, such as indentations, in ground faces, the present invention can be used for other cases where other planar surfaces need to have an appearance of depth. One such typical navigation-related example is the rendering of buildings in city areas. In this case, the rendering techniques of the present invention can be used, for example, when rendering windows in building faces, thereby giving a more realistic rendering effect.

Various modifications and other arrangements can be used in the present embodiments and the present invention if desired.

For example, the spacing between the "front", ground (base) level plane and the virtual "displaced" rear plane could be decreased automatically as a function of the viewing distance.

If the graphics hardware of the navigation device 200 supports pixel shading operations, those operations can be used to further increase the overall visual quality of the tiles. For example, pixel shading operations can be used to simulate the effect of reflected sunlight or waves to create a realistic water effect.

As will be appreciated by those skilled in the art, although the above example has been described primarily with reference to the rendering of a single tile position in the 3D world space, the present invention may be used for as many tile positions as are desired in the image being displayed. Indeed, it may typically be used for a series of contiguous tiles through which, e.g., a given water feature, such as a river, passes. The remaining tiles making up the image may be rendered in the normal manner.

Although the present invention has been described above with particular reference to its use in portable navigation devices (and, as will be appreciated by those skilled in the art, the present invention has particular application and advantage in systems with limited graphical capabilities such as mobile or embedded systems), the present invention can be used advantageously in high-end systems as well. For example, a 3D view of a city may contain hundreds of buildings and while a high performance graphics accelerator may be able to render those buildings in detail using high vertex models, the techniques of the present invention may be more efficient for the large numbers of geometry further away from the viewer where detail is typically less important than for the portions of the image that are nearer to the viewer. For those nearer portions, full 3D, high detail, high vertex models can still be used, thereby balancing performance and quality.

The present invention can also be used, for example, to get a distinctive "signature" look for a displayed image, and/or to provide a better user experience because details may be left out, thereby creating a picture that may be "easier on the eye" overall.

As will be appreciated from the above, the present invention provides a relatively fast and efficient way to improve the visual quality of e.g., tile-based map display, which is, inter alia, particularly suited to embedded graphics hardware, since it can create suitable effects with only a limited increase in geometry or no increase in geometry. The invention may also be used with more powerful graphics accelerators, as it can be used to decrease the amount geometry needed to be stored and rendered.

It may be used, for example, for rendering water features, building roofs, tunnels, etc., or any other features which stand above or below a particular reference plane.

This is achieved, in the preferred embodiments of the present invention at least, by rendering a view dependent edge effect that gives the impression of multiple layers yet is achieved by only rendering a single layer (using, e.g. multi-texturing or pixel shading techniques). In particular, borders of features that are below (or above) a base plane are rendered to show a (typically) dark edge thereby obtaining the visual impression of a height difference. Essentially, the technique gives the human visual system the perception of depth, where in fact all the rendering is produced on a layer of the same depth.

As the approaches of the present invention only use a single primitive (or layer of primitives), they are resource efficient both in terms of texture storage and data traffic and in terms of processing. They will also be more efficient than techniques that render two or more layers of primitives to achieve depth effects (as fewer primitives need to be rendered).

The techniques of the present invention can thus provide an efficient way to provide the impression of depth in images when performing, e.g. 3D map rendering.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more ASICs (application specific integrated circuit)) or indeed by a mix of hardware and software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of displaying an image, comprising:
providing a first graphics texture comprising a first feature having an edge with a second feature;
providing a second graphics texture;
using a first graphics texture in combination with the second graphics texture to apply a texture to a graphics primitive or primitives representing the image to be displayed in order to display the image; and
displaying the graphics primitive or primitives representing the image having the applied texture to display the image;
wherein the second graphics texture and the combining operation are configured such that using the first graphics texture in combination with the second texture causes the first feature to be bordered, in the displayed image, by a border region that represents a border to that feature, wherein the first feature is perceived to be in a different horizontal or vertical plane from the second feature.

2. The method of claim 1, wherein the step of using the first graphics texture in combination with the second graphics texture to apply a texture to a graphics primitive or primitives representing the image to be displayed, comprises:
combining the first graphics texture with the second graphics texture; and
displaying the combined first and second graphics textures to the graphics primitive or primitives representing the image to be displayed in order to display the image.

3. The method of claim 1, wherein:
the first feature in the first graphics texture is a transparent region; and
using the first graphics texture in combination with the second graphics texture to apply a texture to a graphics primitive or primitives representing the image to be displayed, comprises:
combining the first graphics texture with a version of the graphics second texture that has been perspectively correctly displaced in dependence on the view direction, and applying the combined first and second graphics textures to the graphics primitive or primitives representing the image to be displayed in order to display the image.

4. The method of claim 1, wherein the second graphics texture is in the form of a modulation map that contains values that will modulate the intensity of selected regions of the first texture when the two textures are combined.

5. The method of claim 4, wherein the second graphics texture is derived from a height map that is indicative of the relative heights of the different features in the first graphics texture, and a version of the height map that has been perspectively correctly displaced in dependence on the view direction.

6. The method of claim 1, wherein:
the second graphics texture is a displaced version of the first graphics texture; and
using the first graphics texture in combination with the second graphics texture to apply a texture to a graphics primitive or primitives representing the image to be displayed comprises comparing the first graphics texture with the second graphics texture and selectively modifying the display of the first graphics texture on the primitive or primitives on the basis of the comparison of the first and second graphics textures.

7. The method of claim 1, wherein:
the second graphics texture is a displaced version of the first texture; and
the output colour to be displayed for a pixel of a primitive representing the image or tile is based on a comparison of the value of the first graphics texture for the pixel in question with the value of the second graphics texture for the pixel in question.

8. The method of claim 1, wherein the first graphics texture represents ground level features.

9. The method of claim 1, wherein the second graphics texture is in a vertical plane above or below the first graphics texture.

10. An apparatus for displaying an image, comprising at least one processor configured to:
provide a first graphics texture comprising a first feature having an edge with a second feature;
provide a second graphics texture;
use the first graphics texture in combination with a second graphics texture to apply a texture to a graphics primitive or primitives representing the image to be displayed in order to display the image; and
display the graphics primitive or primitives representing the image having the applied texture to display the image;
wherein the second graphics texture and the combining operation are configured such that using the first graphics texture in combination with the second graphics texture causes the first feature to be bordered, in the displayed image, by a border region that represents a border to that feature, wherein the first feature is perceived to be in a different horizontal or vertical plane from the second feature.

11. The apparatus of claim 10, wherein the apparatus comprises a navigation or mapping apparatus comprising a display for displaying a digital map to a user, and wherein the least one processor is further configured to access digital map data and cause a digital map to be displayed on the display by rendering a tile to be displayed to display the map information:
wherein the image to be displayed comprises a map tile, and
wherein the first and second features in the first graphics texture comprise map features.

12. The apparatus of claim 10, wherein the apparatus is incorporated into a portable navigation device (PND) or an integrated navigation system.

13. A non-transitory computer readable medium comprising which stores a set of instructions which when executed performs a method of displaying an image, the method executed by the set of instructions comprising:
providing a first graphics texture comprising a first feature having an edge with a second feature;
providing a second graphics texture;
using a first graphics texture in combination with the second graphics texture to apply a texture to a graphics primitive or primitives representing the image to be displayed in order to display the image; and
displaying the graphics primitive or primitives representing the image having the applied texture to display the image;
wherein the second graphics texture and the combining operation are configured such that using the first graphics texture in combination with the second texture causes the first feature to be bordered, in the displayed image, by a border region that represents a border to that feature, wherein the first feature is perceived to be in a different horizontal or vertical plane from the second feature.

* * * * *